United States Patent
Yasui et al.

(10) Patent No.: US 6,904,355 B2
(45) Date of Patent: Jun. 7, 2005

(54) VEHICLE CONTROLLER FOR CONTROLLING AN AIR-FUEL RATIO

(75) Inventors: Yuji Yasui, Saitama (JP); Yoshihisa Iwaki, Saitama (JP); Akihiro Shinjo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/635,464

(22) Filed: Aug. 7, 2003

(65) Prior Publication Data

US 2004/0030484 A1 Feb. 12, 2004

(30) Foreign Application Priority Data

Aug. 9, 2002 (JP) .................................. 2002-234045

(51) Int. Cl.[7] .................................................. B60T 7/12
(52) U.S. Cl. .................... 701/108; 701/102; 701/115; 701/103; 73/118.1; 73/117.3; 60/275; 60/277; 60/285; 123/90.11; 123/90.15
(58) Field of Search .............................. 701/108, 103, 701/104, 106, 114, 115, 102; 73/117.3, 118.1; 60/274, 275, 276, 277, 285; 123/90.11, 91.15

(56) References Cited

U.S. PATENT DOCUMENTS 6,256,983 B1 * 7/2001 Yasui .......................... 60/285
6,266,605 B1 * 7/2001 Yasui et al. .................. 701/109
6,449,943 B1 * 9/2002 Ueno et al. ................... 60/274
6,449,944 B1 * 9/2002 Yasui et al. ................... 60/277
6,477,458 B1 * 11/2002 Yasui et al. .................. 701/109

FOREIGN PATENT DOCUMENTS

JP          11-153051          6/1999

* cited by examiner

Primary Examiner—Willis R. Wolfe
Assistant Examiner—Johnny H. Hoang
(74) Attorney, Agent, or Firm—Squire, Sanders & Dempsey L.L.P.

(57) ABSTRACT

A vehicle controller for controlling the air-fuel ratio of an engine is provided. In one embodiment, the controller comprises a first exhaust gas sensor provided downstream of the catalyst for detecting oxygen concentration of exhaust gas, a first decimation filter connected to the first exhaust gas sensor, and a control unit connected to the first decimation filter. The control unit determines a manipulated variable for manipulating the air-fuel ratio. The first decimation filter oversamples, low-pass filters and then downsamples the output of the first exhaust gas sensor. The first decimation filter can remove chemical noise from the output of the exhaust gas sensor. In another embodiment, a second decimation filter is connected to a second exhaust gas sensor provided upstream of the catalyst for detecting the air-fuel ratio of the exhaust gas. The second decimation filter oversamples, low-pass filters and then downsamples the output of the second exhaust gas sensor. The second decimation filter can compensate the shortage of resolution of the air-fuel ratio sensor.

32 Claims, 22 Drawing Sheets

VEHICLE CONTROLLER FOR CONTROLLING AN AIR-FUEL RATIO

BACKGROUND OF THE INVENTION

1. Technical Field

The invention relates to a controller for controlling an air-fuel ratio based on an output of an exhaust gas sensor disposed in an exhaust system of an internal-combustion engine.

2. Description of the Related Art

A catalyst converter is provided in an exhaust system of an internal combustion engine of a vehicle. When the air-fuel ratio of air-fuel mixture introduced into the engine is lean, the catalyst converter oxidizes HC and CO with excessive oxygen included in the exhaust gas. When the air-fuel ratio is rich, the catalyst converter reduces Nox with HC and CO. When the air-fuel ratio is in the stoichiometric air-fuel ratio region, HC, CO and Nox are simultaneously and effectively purified.

An exhaust gas sensor is provided downstream of the catalyst converter. The exhaust gas sensor detects the concentration of oxygen included in the gas that is discharged into the exhaust system. Feedback control for the air-fuel ratio of the engine is performed based on the output of the exhaust gas sensor.

As an example of the feedback control for the air-fuel ratio, Japanese Patent Application Unexamined Publication No. H11-153051 proposes response assignment control in which a switching function is defined. This control converges the output of the exhaust gas sensor to a target value by converging the value of the switching function to zero. A controlled variable (a target air-fuel ratio) for converging the output of the exhaust gas sensor to the target value is calculated. The output of the exhaust gas sensor and the output of the air-fuel ratio (LAF) sensor, which is disposed upstream of the catalyst converter for detecting the air-fuel ratio, are used for the calculation of the controlled variable. A fuel amount to be supplied to the engine is controlled according to the calculated controlled variable.

Recently, there is a trend to enhance a response of the exhaust gas sensor so as to stabilize the accuracy of detecting deterioration of the catalyst and to decrease the amount of discharged NOx. When a response of the exhaust gas sensor is enhanced, high-frequency components, which are called chemical noise, may be introduced into the output of the exhaust gas sensor. Such chemical noise may cause variations in the target air-fuel ratio because the target air-fuel ratio is calculated based on the output of the exhaust gas sensor. Such variations in the target air-fuel ratio may cause a large variation in the actual air-fuel ratio, which reduces the purification rate of the catalyst.

The air-fuel ratio is sometimes made rich so as to protect the engine and the catalyst. Such enrichment of the air-fuel ratio increases the amount of discharged CO. In order to suppress the discharge of CO, it is preferable to perform the air-fuel ratio control in a form of closed loop. On the other hand, the air-fuel ratio control for making the air fuel ratio lean may be performed so as to improve the fuel efficiency. In such a state in which the air-fuel ratio is made lean, it is preferable to perform the air-fuel ratio control in the form of closed loop. In order to stably perform the closed-loop air-fuel ratio control, there is a trend to expand a detection range of the air-fuel ratio (LAF) sensor.

There is a limitation in the performance of an A/D converter that converts an analog signal from the air-fuel ratio sensor into a digital signal. When a detection range of the air-fuel ratio sensor is expanded, such limitation of the performance of the A/D converter reduces the resolution of the air-fuel ratio detected by the air-fuel ratio sensor. Such resolution reduction may reduce the capability to make the actual air-fuel ratio follow the target air-fuel ratio in the air-fuel ratio control, which reduces the purification rate of the catalyst. Such resolution reduction may also reduce the accuracy of identifying a model parameter for the air-fuel ratio control because the model parameter is identified based on the actual air-fuel ratio. The reduction of the accuracy of identifying a model parameter may also reduce the purification rate of the catalyst.

Therefore, there is a need for an apparatus and a method capable of removing chemical noise from the output of the exhaust gas sensor when a response of the exhaust gas sensor is enhanced. There is also a need for an apparatus and a method capable of compensating the shortage of resolution of the air-fuel ratio sensor when a detection range of the air-fuel ratio sensor is expanded.

SUMMARY OF THE INVENTION

According to a first embodiment of the invention, a controller for controlling an air-fuel ratio of an internal-combustion engine comprises a first exhaust gas sensor for detecting oxygen concentration of the exhaust gas, a first decimation filter connected to the first exhaust gas sensor, and a control unit connected to the first decimation filter. The control unit determines a manipulated variable for manipulating the air-fuel ratio so that an output value from the first decimation filter converges to a target value. The first decimation filter further comprises a first oversampler, a first low-pass filter, and a first downsampler. The first oversampler oversamples the output of the first exhaust gas sensor in a shorter cycle than a cycle that is used for determining the manipulated variable. The first low-pass filter smoothes the oversampled value. The first downsampler re-samples the smoothed value in the cycle that is used for determining the manipulated variable. Thus, the first decimation filter outputs the re-sampled value.

As described above, when a response of the first exhaust gas sensor is enhanced, chemical noise may appear in the output of the first exhaust gas sensor. The first decimation filter can remove such chemical noise. The air-fuel ratio control based on the output from the first decimation filter prevents the purification rate of the catalyst from deteriorating.

According to a second embodiment of the invention, a controller for controlling an air-fuel ratio of an internal-combustion engine comprises a first exhaust gas sensor provided downstream of a catalyst converter, a second exhaust gas sensor provided upstream of the catalyst converter, a second decimation filter connected to the second exhaust gas sensor, and a control unit connected to the second decimation filter. The first exhaust gas sensor detects oxygen concentration of the exhaust gas. The second exhaust gas sensor detects an air-fuel ratio of the exhaust gas. The control unit uses an output value from the second decimation filter to determine a manipulated variable for manipulating the air-fuel ratio so that an output value from the first exhaust gas sensor converges to a target value. The second decimation filter further comprises a second oversampler, a second low-pass filter, and a second downsampler. The second oversampler oversamples the output of the second exhaust gas sensor in a shorter cycle than a cycle that is used for determining the manipulated variable. The second low-pass filter smoothes the oversampled value. The second downsampler re-samples the smoothed value in the cycle that is used for determining the manipulated variable. Thus, the second decimation filter outputs the re-sampled value.

As described above, when a detection range of the second exhaust gas sensor is expanded, the resolution of the air-fuel ratio detected by the second exhaust gas sensor may be reduced. The second decimation filter can compensate the shortage of resolution of the second exhaust gas sensor. Specifically, the second decimation filter estimates detection values below the resolution limit of the second exhaust gas sensor. The air-fuel ratio control based on the output from the second decimation filter prevents the purification rate of the catalyst from deteriorating.

According to one embodiment of the invention, the manipulated variable is determined by response assignment control. The response assignment control can stably and quickly cause the output of the first exhaust gas sensor to converge to a target value.

According to another embodiment of the invention, the manipulated variable is determined by performing control that uses one of $\Delta\Sigma$ (delta-sigma) modulation algorithm, $\Delta$ (delta) modulation algorithm and $\Sigma\Delta$ (sigma-delta) modulation algorithm. The control using such an algorithm can stably cause the output of the first exhaust gas sensor to converge to a target value even when a delay in the response of an object to be controlled by the air-fuel ratio control is large.

According to one embodiment of the invention, an object to be controlled is an exhaust system. The exhaust system extends from the second exhaust gas sensor through the catalyst converter to the first exhaust gas sensor. In the first embodiment described above, a dead time in the exhaust system is determined based on the output value from the first decimation filter. An estimated value for the output of the first exhaust gas sensor is calculated so that the dead time in the exhaust system is compensated. The estimated value is used to determine the manipulated variable for manipulating the air-fuel ratio. Since the estimated value for the output of the first exhaust gas sensor is determined considering the dead time in the exhaust system, the manipulated variable enables the output value from the first exhaust gas sensor to stably converge to a target value. In the second embodiment described above, the dead time in the exhaust system is determined based on the output value from the second decimation filter.

According to yet another embodiment of the invention, the object of the air-fuel ratio control further includes an air-fuel ratio manipulating system. The air-fuel ratio manipulating system extends from the control unit for determining the manipulated variable through the engine to the second exhaust gas sensor. In the first embodiment described above, a dead time in the air-fuel ratio manipulating system is determined based on the output value from the first decimation filter. An estimated value for the output of the first exhaust gas sensor is calculated so that the dead time in the exhaust system and the dead time in the air-fuel ratio manipulating system are compensated. The estimated value is used to determine the manipulated variable for manipulating the air-fuel ratio. Since the estimated value for the output of the first exhaust gas sensor is determined considering the dead time both in the exhaust system and in the air-fuel ratio manipulating system, the manipulated variable enables the output value from the first exhaust gas sensor to stably converge to a target value. In the second embodiment described above, the dead time in the air-fuel ratio manipulating system is determined based on the output value from the second decimation filter.

According to yet another embodiment of the invention, the control unit calculates a parameter that is used for determining the manipulated variable. The parameter acts to adapt the air-fuel ratio manipulation to state changes of the exhaust system. In the first embodiment described above, the parameter is calculated based on the output value from the first decimation filter. Since the output from the first decimation filter does not include chemical noise, the parameter is calculated with a better accuracy. In the second embodiment described above, the parameter is calculated based on the output value from the second decimation filter. Since the second decimation filter provides detection values below the resolution limit of the second exhaust gas sensor, the parameter is calculated with a better accuracy.

According to yet another embodiment of the invention, a cut-off frequency of the first and second low-pass filters of the first and second decimation filters is set to a higher frequency than a frequency that is used for detecting a failure of the catalyst. Thus, the air-fuel ratio control can be performed without reducing the accuracy of detecting a failure of the catalyst.

DESCRIPTION OF THE PREFERRED EMBODIMENTS

Structure of Internal-combustion Engine and Control Apparatus

Figure 1:
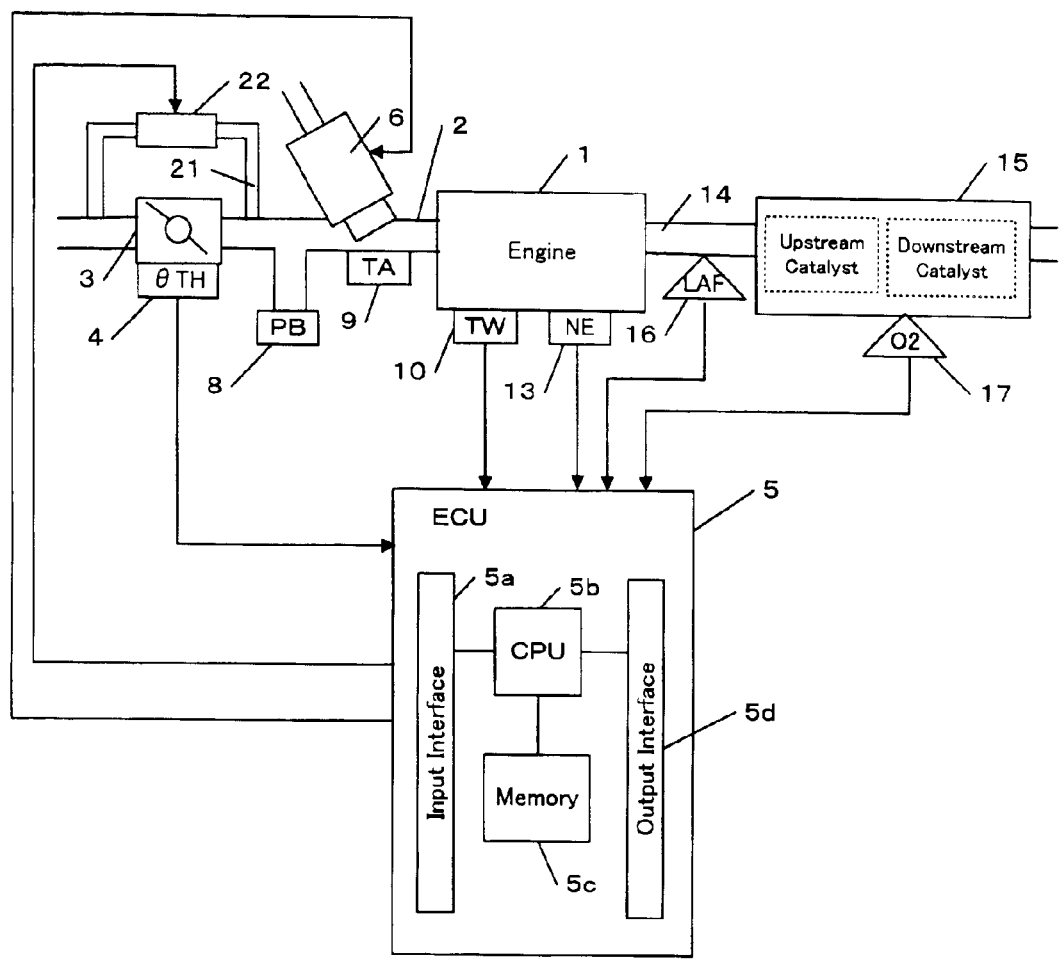
FIG. 1 is a schematic view of an internal combustion engine and its controller according to one embodiment of the present invention.

Preferred embodiments of the present invention will be described referring to the attached drawings. FIG. 1 is a block diagram showing a controller of an internal-combustion engine (hereinafter referred to as an engine) in accordance with one embodiment of the invention.

An electronic control unit (hereinafter referred to as an ECU) 5 comprises an input interface 5a for receiving data sent from each part of the engine 1, a CPU 5b for carrying out operations for controlling each part of the engine 1, a storage device 5c including a read only memory (ROM) and a random access memory (RAM), and an output interface 5d for sending control signals to each part of the engine 1. Programs and various data for controlling each part of the vehicle are stored in the ROM. A program for controlling an air-fuel ratio according to the invention, data and tables used for operations of the program are stored in the ROM. The ROM may be a rewritable ROM such as an EEPROM. The RAM provides work areas for operations by the CPU 5a, in which data sent from each part of the engine 1 as well as control signals to be sent out to each part of the engine 1 are temporarily stored.

The engine 1 is, for example, an engine equipped with four cylinders. An intake manifold 2 is connected to the engine 1. A throttle valve 3 is disposed upstream of the intake manifold 2. A throttle valve opening (θTH) sensor 4, which is connected to the throttle valve 3, outputs an electric signal corresponding to an opening angle of the throttle valve 3 and sends it to the ECU 5.

A bypass passage 21 for bypassing the throttle valve 3 is provided in the intake manifold 2. A bypass valve 22 for controlling the amount of air to be supplied into the engine 1 is provided in the bypass passage 21. The bypass valve 22 is driven in accordance with a control signal from the ECU 5.

A fuel injection valve 6 is provided for each cylinder at an intermediate point in the intake manifold 2 between the engine 1 and the throttle valve 3. The fuel injection valve 6 is connected to a fuel pump (not shown) to receive fuel supplied from a fuel tank (not shown). The fuel injection valve 6 is driven in accordance with a control signal from the ECU 5.

An intake manifold pressure (Pb) sensor 8 and an outside air temperature (Ta) sensor 9 are mounted in the intake manifold 2 downstream of the throttle valve 3. The detected intake manifold pressure Pb and outside air temperature Ta are sent to the ECU 5.

An engine water temperature (TW) sensor 10 is attached to the cylinder peripheral wall, which is filled with cooling water, of the cylinder block of the engine 1. The temperature of the engine cooling water detected by the TW sensor is sent to the ECU 5.

A rotational speed (Ne) sensor 13 is attached to the periphery of the camshaft or the periphery of the crankshaft (not shown) of the engine 1, and outputs a CRK signal pulse at a predetermined crank angle cycle (for example, a cycle of 30 degrees) that is shorter than a TDC signal pulse cycle issued at a crank angle cycle associated with a TDC position of the piston. CRK pulses are counted by the ECU 5 to determine the rotational speed Ne of the engine 1.

An exhaust manifold 14 is connected to the engine 1. The engine 1 discharges exhaust gas through the exhaust manifold 14. A catalyst converter 15 removes deleterious substances such as HC, CO, and Nox included in exhaust gas flowing through the exhaust manifold 14. The catalyst converter 15 comprises two catalysts, an upstream catalyst and a downstream catalyst.

A full range air-fuel ratio (LAF) sensor 16 is provided upstream of the catalyst converter 15. The LAF sensor 16 linearly detects the concentration of oxygen included in exhaust gas over a wide air-fuel ratio zone, from the rich zone where the air/fuel ratio is richer than the stoichiometric air/fuel ratio to an extremely lean zone. The detected oxygen concentration is sent to the ECU 5.

An O2 (exhaust gas) sensor 17 is provided between the upstream catalyst and the downstream catalyst. The O2 sensor 17 is a binary-type of exhaust gas concentration sensor. The O2 sensor outputs a high level signal when the air-fuel ratio is richer than the stoichiometric air-fuel ratio, and outputs a low level signal when the air-fuel ratio is leaner than the stoichiometric air-fuel ratio. The electric signal is sent to the ECU 5.

The O2 sensor 17 may be referred to as a first exhaust gas sensor. The LAF sensor 16 may be referred to as a second exhaust gas sensor.

Signals sent to the ECU 5 are passed to the input circuit 5a. The input interface 5a converts analog signal values into digital signal values. The CPU 5b processes the resulting digital signals, performs operations in accordance with the programs stored in the ROM, and creates control signals. The output interface 5d sends these control signals to actuators for the bypass valve 22, fuel injection valve 6 and other mechanical components.

Figure 2:
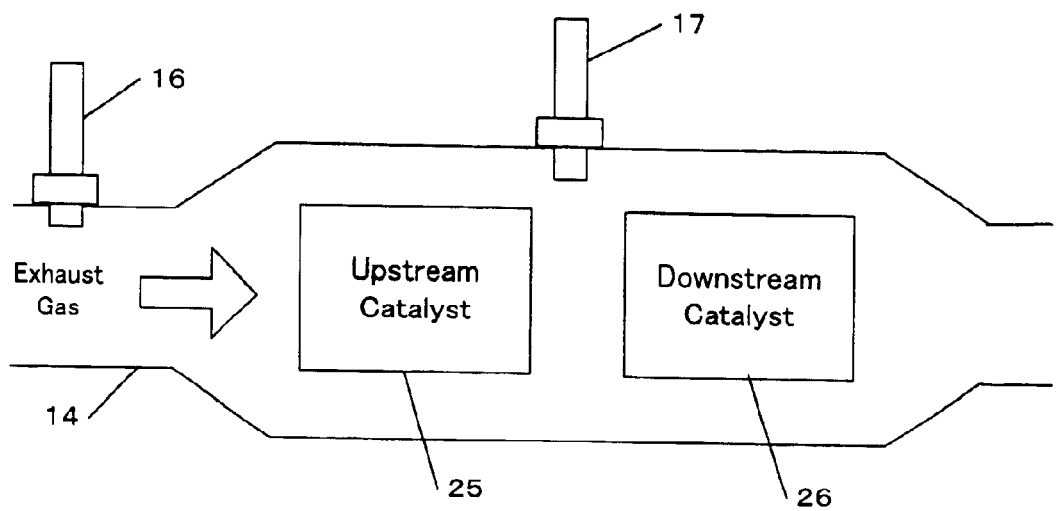
FIG. 2 is a view of layout of a catalyst converter and an exhaust gas sensor according to one embodiment of the present invention.

FIG. 2 shows a structure of the catalyst converter 15. Exhaust gas introduced into the exhaust manifold 14 passes through the upstream catalyst 25 and then through the downstream catalyst 26. It is known that it is easier to maintain the purification rate of Nox at an optimal level by air-fuel ratio control based on the output of an O2 sensor provided between the upstream and downstream catalysts, compared with air-fuel ratio control based on the output of an O2 sensor provided downstream of the downstream catalyst. Therefore, in the embodiment of the invention described hereafter, the O2 sensor 17 is provided between the upstream and downstream catalysts. The O2 sensor 17 detects the concentration of oxygen included in the exhaust gas after the passage through the upstream catalyst 25.

Alternatively, the O2 sensor may be disposed downstream of the downstream catalyst 26. If the catalyst converter 15 is implemented with a single catalyst, the O2 sensor is disposed downstream of the catalyst converter 15.

Figure 3:
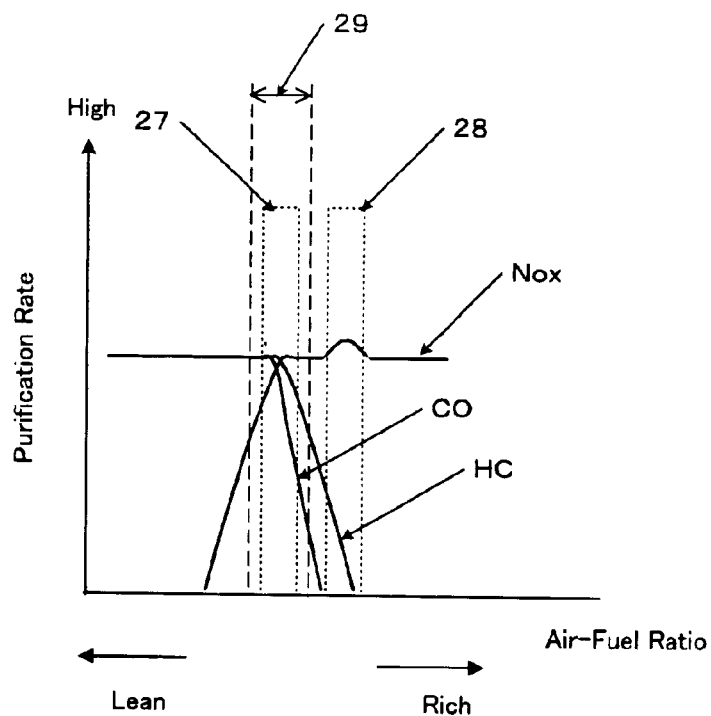
FIG. 3 shows an outline of air-fuel ratio control according to one embodiment of the present invention.

FIG. 3 shows purification behavior of the upstream catalyst and the downstream catalyst. A window 27 indicates an air-fuel ratio region in which CO, HC and Nox are optimally purified. Since oxygen included in exhaust gas is consumed by the purification in the upstream catalyst 25, the exhaust gas supplied to the downstream catalyst 26 exhibits a reduction atmosphere (i.e., a rich state) as shown by a window 28. In such a reduction atmosphere, Nox is further purified. Thus, the cleaned exhaust gas is discharged.

In order to optimally maintain the purification performance of the catalyst converter 15, adaptive control of the air-fuel ratio according to the invention causes the output of the O2 sensor 17 to converge to a target value so that the air-fuel ratio is within the window 27.

A reference number 29 shows an allowable range that defines a limitation of a variable manipulated by the adaptive air-fuel ratio control, which will be described in detail later.

Adaptive Air-fuel Ratio Control in Accordance with a First Embodiment

Figure 4:
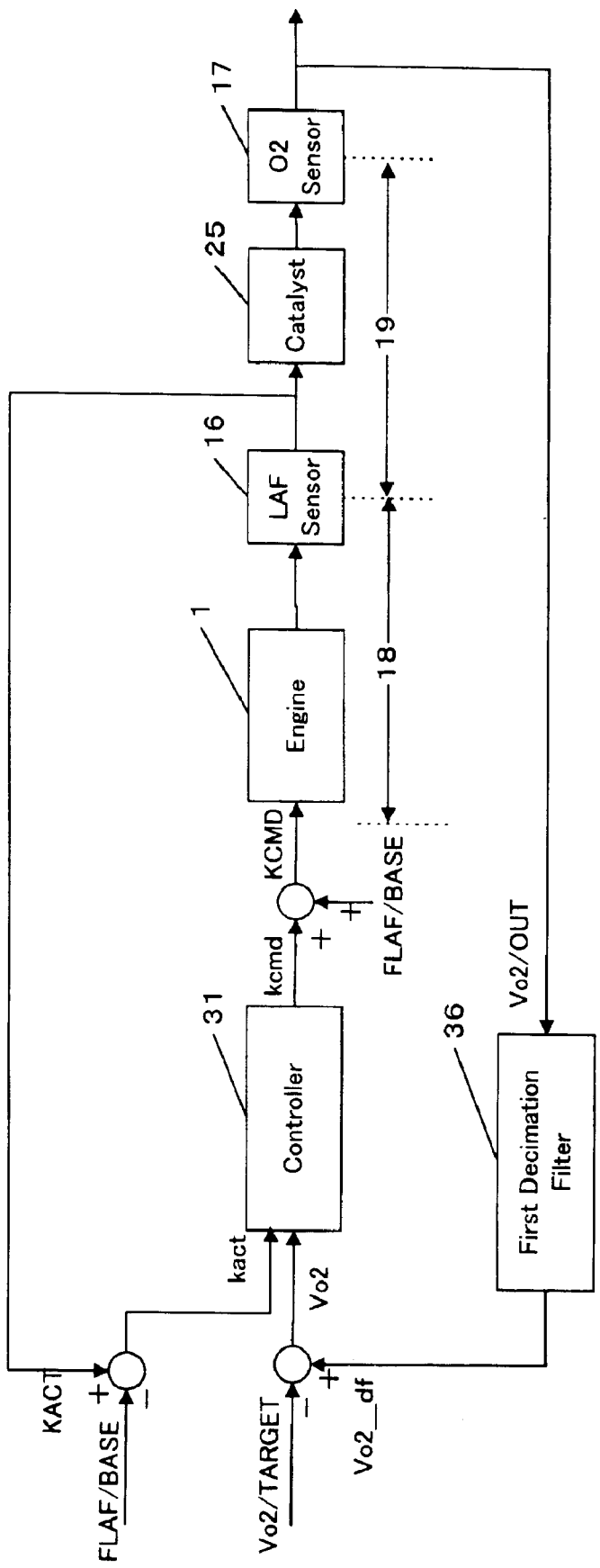
FIG. 4 is a block diagram of air-fuel ratio control according to a first embodiment of the present invention.

FIG. 4 shows a block diagram of adaptive air-fuel ratio control in accordance with a first embodiment of the invention. The LAF sensor 16 detects an air-fuel ratio KACT of the exhaust gas supplied to the upstream catalyst 25. The O2 sensor 17 outputs a voltage Vo2/OUT that indicates the oxygen concentration of the exhaust gas after the purification by the upstream catalyst 25.

The output Vo2/OUT from the O2 sensor 17 is delivered to a first decimation filter 36. The first decimation filter 36 oversamples the output Vo2/OUT of the O2 sensor 17, performs a low-pass filtering process on the oversampled value, and then downsamples the filtered value. The output from the first decimation filter 36 is represented by a sample value Vo2_df. The sample value Vo2_df is compared with a target value Vo2/TARGET. An error Vo2 between the sample value Vo2_df and the target value Vo2/TARGET is supplied to a controller 31.

An object (i.e., plant) to be controlled by the adaptive air-fuel ratio control is an exhaust system 19 extending from the LAF sensor 16 through the upstream catalyst 25 to the O2 sensor 17. The controller 31 determines a target air-fuel ratio error "kcmd" based on the error Vo2. The target air-fuel ratio error kcmd is added to a base value FLAF/BASE to determine a target air-fuel ratio KCMD. A fuel injection amount is corrected in accordance with the target air-fuel ratio KCMD and is supplied to the engine 1. After the fuel injection, the output Vo2/OUT of the O2 sensor 17 is detected again.

Thus, the controller 31 performs a feedback control to determine the target air-fuel ratio KCMD so that the error Vo2 converges to zero. The exhaust system 19, which is the controlled object, can be modeled as shown by the equation (1) in which Vo2/OUT is defined as a control output and the output KACT of the LAF sensor is defined as a control input. The exhaust system 19 is modeled as a discrete-time system. Such modeling can make the air-fuel ratio control algorithm simple and suitable for computer processing.

$$Vo2'(k+1)=a1 \cdot Vo2'(k)+a2 \cdot Vo2'(k-1)+b1 \cdot kact(k-d3) \text{ where } Vo2'(k)= Vo2/OUT(k)-Vo2/TARGET \ kact(k)=KACT(k)-FLAF/BASE \quad (1)$$

"k" is an identifier for identifying a control cycle. A sensor output error Vo2' indicates an error between the O2 sensor output Vo2/OUT and the target value Vo2/TARGET. An actual air-fuel ratio error "kact" indicates an error between the LAF sensor output KACT and the base value FLAF/BASE. The base value FLAF/BASE is set to be a central value for the target air-fuel ratio KCMD. For example, the base value is set to a value indicative of stoichiometry (that is, FLAF/BASE=1). The base value FLAF/BASE may be a constant value, or may be established according to the operating state of the engine.

"d3" indicates a dead time in the exhaust system 19. The dead time d3 is a time required for the air-fuel ratio detected by the LAF sensor 16 to be reflected in the output of the O2 sensor 17. "a1", "a2" and "b1" are model parameters, which are generated by an identifier. The identifier will be described later.

Relation between the O2 sensor output Vo2/OUT and the output Vo2_df of the first decimation filter is expressed as shown in the equation (2).

$$Vo2/OUT \ (k)=Vo2\_df(k+d5) \quad (2)$$

"d5" indicates a dead time in the first decimation filter 36. The dead time d5 is a time required for the O2 sensor output Vo2/OUT to be oversampled, filtered using a low-pass filter and then downsampled. The dead time d5 is, for example, one control cycle (that is, d5=1).

A system including the exhaust system 19 and the first decimation filter 36 is determined based on the equations (1) and (2), as shown in the equation (3).

$$\begin{aligned} Vo2(k+1) &= a1 \cdot Vo2(k) + a2 \cdot Vo2(k-1) + \\ & \quad b1 \cdot kact(k-d3-d5) \\ &= a1 \cdot Vo2(k) + a2 \cdot Vo2(k-1) + b1 \cdot kact(k-d1) \end{aligned} \quad (3)$$

where $$Vo2(k) = Vo2\_df(k) - Vo2/TARGET$$

$$kact(k) = KACT(k) - FLAF/BASE$$

$$d1 = d3 + d5$$

Thus, incorporation of the first decimation filter 36 increases the dead time in the exhaust system.

On the other hand, an air-fuel ratio manipulating system 18 extending from the ECU 5 through the engine 1 to the LAF sensor 16 can be modeled as shown by the equation (4).

$$kact(k)=kcmd(k-d2) \text{ where } kact(k)=KACT(k)-FLAF/BASE \ kcmd(k)=KCMD(k)-FLAF/BASE \quad (4)$$

The target air-fuel ratio error "kcmd" indicates an error between the target air-fuel ratio KCMD and the base value FLAF/BASE. "d2" indicates a dead time in the air-fuel ratio manipulating system 18. The dead time d2 is a time required for the calculated target air-fuel ratio KCMD to be reflected in the output KACT of the LAF sensor 16.

The air-fuel ratio manipulating system 18 may be included in the object to be controlled by the adaptive air-fuel ratio control. In this case, the model equation is expressed based on the equations (3) and (4), as shown by the equation (5). A dead time "d" is a total dead time in a system comprising the air-fuel ratio manipulating system 18, the exhaust system 19, and the first decimation filter 36. Incorporation of the first decimation filter 36 increases the dead time.

$$Vo2(k+1) = a1 \cdot Vo2(k) + a2 \cdot Vo2(k-1) + \\ b1 \cdot kcmd(k-d1-d2) \\ = a1 \cdot Vo2(k) + a2 \cdot Vo2(k-1) + \\ b1 \cdot kcmd(k-d) \quad (5)$$

where $$d = d1 + d2 + d2 = d3 + d5 + d2$$

Figure 5:
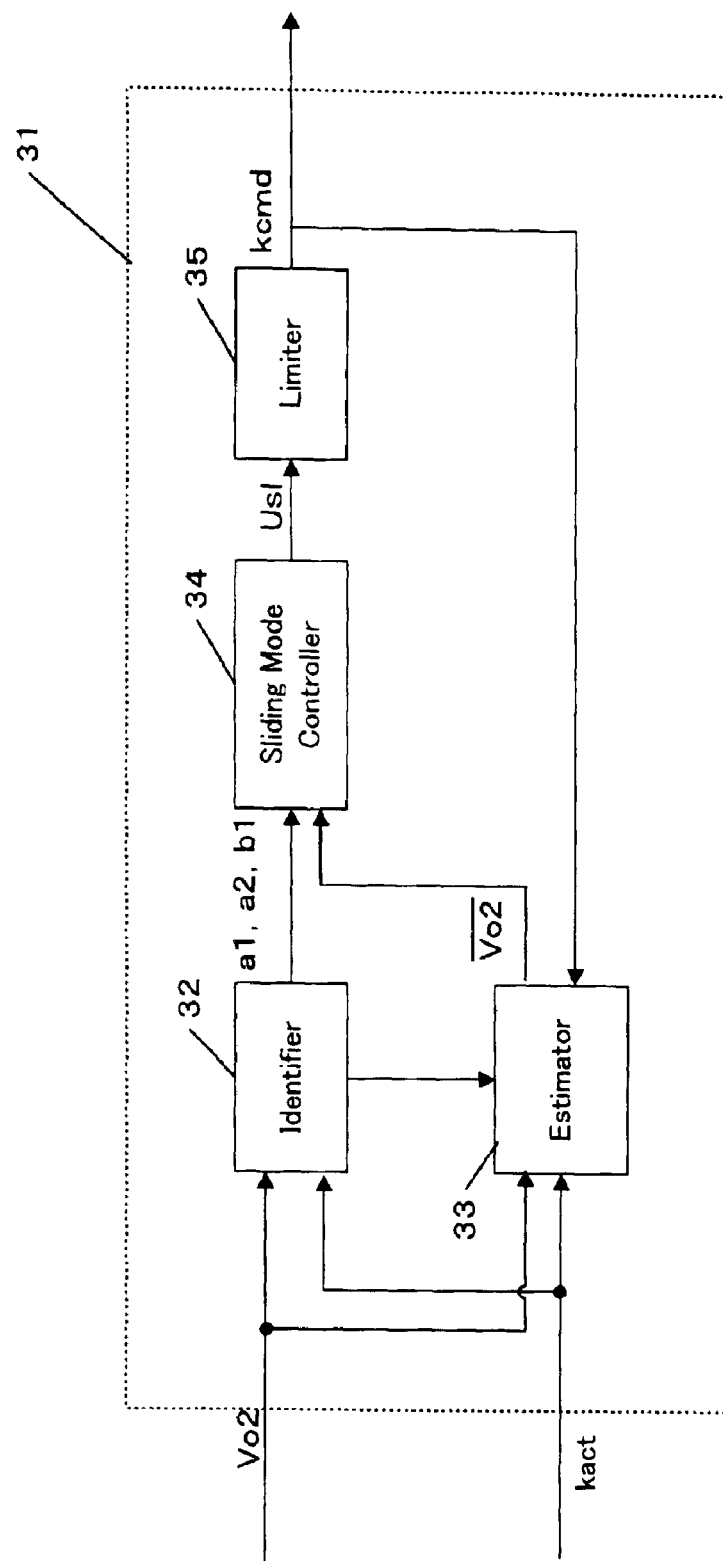
FIG. 5 is a detailed functional block diagram of a controller according to one embodiment of the present invention.

FIG. 5 shows a more detailed block diagram of the controller 31 shown in FIG. 4. The controller 31 comprises an identifier 32, an estimator 33, a sliding mode controller 34, and a limiter 35.

The identifier 32 identifies the model parameters a1, a2 and b1 in the equation (3) so that a modeling error is removed. An identification method performed by the identifier 32 will be described.

The identifier 32 uses model parameters â1(k−1), â2(k−1) and b̂1(k−1) that have been calculated in the previous control cycle to determine a sensor output error V̂o2(k) for the current cycle in accordance with the equation (6).

$$V\hat{o}2(k) = \hat{a}1(k-1) \cdot Vo2(k-1) + \\ \hat{a}2(k-1) \cdot Vo2(k-2) + \hat{b}1(k-1) \cdot kact(k-d1-1) \quad (6)$$

The equation (7) indicates an error id/e(k) between the sensor output error V̂o2(k) that is calculated in accordance with the equation (6) and a sensor output error Vo2(k) that is actually detected in the current control cycle.

$$id/e(k) = Vo2(k) - V\hat{o}2(k) \quad (7)$$

The identifier 32 calculates â1(k), â2(k) and b̂1(k) for the current cycle so that the error id/e(k) is minimized. Here, a vector θ is defined as shown in the equation (8).

$$\Theta^T(k) = [\hat{a}1(k)\ \hat{a}2(k)\ \hat{b}1(k)] \quad (8)$$

The identifier 32 determines â1(k), â2(k) and b̂1(k) in accordance with the equation (9). As shown by the equation (9), â1(k), â2(k) and b̂1(k) for the current control cycle are calculated by changing â1(k), â2(k) and b̂1(k) calculated in the previous control cycle by an amount proportional to the error id/e(k).

$$\Theta(k) = \Theta(k-1) + K\theta(k) \cdot id/e(k) \quad (9)$$

where $$K\theta(k) = \frac{P(k-1)\xi(k)}{1 + \xi^T(k)P(k-1)\xi(k)}$$

$$\xi^T(k) = [Vo2(k-1)\ Vo2(k-2)\ kact(k-d1-1)]$$

$$P(k) = \frac{1}{\lambda 1(k)}\left[I - \frac{\lambda 2(k)P(k-1)\xi(k)\xi^T(k)}{\lambda 1(k) + \lambda 2(k)\xi^T(k)P(k-1)\xi(k)}\right]P(k-1)$$

$$0 < \lambda 1 \le 1 \quad 0 \le \lambda 2 < 2 \quad I: \text{unit matrix}$$

In order to compensate the dead time "d1" of the exhaust system 19 and the dead time "d2" of the air-fuel ratio manipulating system, the estimator 33 estimates a sensor output error Vo2 after the dead time d (=d1+d2) based on the model equation (5). Specifically, the estimated value $\overline{Vo2}$(k+d) for the sensor output error Vo2 (k+d) after the dead time "d" is determined, as shown by the equation (10). Coefficients α1, α2 and β are calculated using model parameters determined by the identifier 32. Past time-series data kcmd(k−j) (wherein, j=1, 2, . . . d) of the air-fuel ratio error includes air-fuel ratio errors obtained during a period of the dead time "d."

$$\overline{Vo2}(k+d) = \\ \alpha 1 \cdot Vo2(k) + \alpha 2 \cdot Vo2(k-1) + \sum_{j=1}^{d} \beta j \cdot kcmd(k-j) \text{ where} \quad (10)$$

$$\alpha 1 = \text{first}-\text{row, first}-\text{column element of } A^d$$

$$\alpha 2 = \text{first}-\text{row, second}-\text{column element of } A^d$$

$$\beta j = \text{first row elements of } A^{j-1} \cdot B$$

$$A = \begin{bmatrix} a1 & a2 \\ 1 & 0 \end{bmatrix}$$

$$B = \begin{bmatrix} b1 \\ 0 \end{bmatrix}$$

Past values kcmd(k−d2), kcmd(k−d2−1), . . . kcmd(k−d) for the target air-fuel ratio error "kcmd" before the dead time d2 can be replaced with actual air-fuel ratio errors kact(k), kact(k−1), . . . kact(k−d+d2) by using the equation (2). As a result, the equation (11) is derived.

$$\overline{Vo2}(k+d) = \alpha 1 \cdot Vo2(k) + \alpha 2 \cdot Vo2(k) + \quad (11)$$

$$\sum_{j=1}^{d2-1} \beta j \cdot kcmd(k-j) + \sum_{i=0}^{d-d2} \beta i + d2 \cdot kact(k-i)$$

$$= \alpha 1 \cdot Vo2(k) + \alpha 2 \cdot Vo2(k-1) +$$

$$\sum_{j=1}^{d2-1} \beta j \cdot kcmd(k-j) + \sum_{i=0}^{d1} \beta i + d2 \cdot kact(k-i)$$

The sliding mode controller 34 establishes a switching function σ so as to perform the sliding mode control, as shown in the equation (12).

$$\sigma(k) = s \cdot Vo2\ (k-1) + Vo2\ (k) \quad (12)$$

Vo2(k−1) indicates the sensor output error detected in the previous cycle as described above. Vo2(k) indicates the sensor output error detected in the current cycle. "s" is a setting parameter of the switching function σ, and is established to satisfy −1<s<1.

The equation in the case of σ(k)=0 is called an equivalent input system, which specifies the convergence characteristics of the sensor output error Vo2, or a controlled variable. Assuming σ(k)=0, the equation (12) is transformed to the equation (13).

$$Vo2(k) = -s \cdot Vo2(k-1) \quad (13)$$

Figure 6:
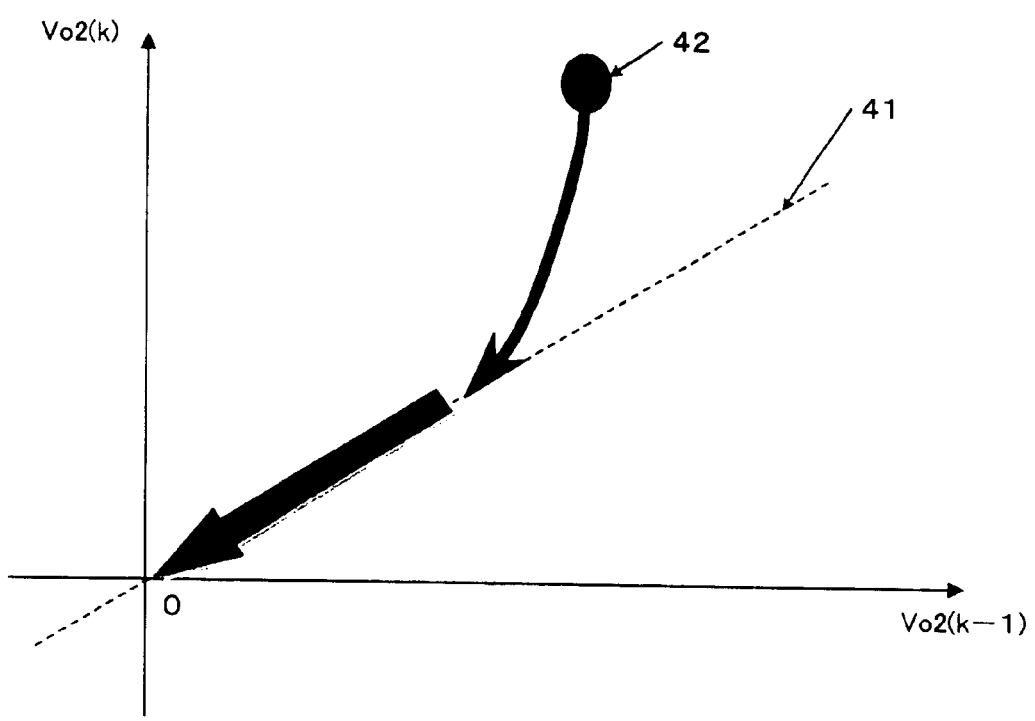
FIG. 6 schematically shows a switching line for response assignment control according to one embodiment of the present invention.

Now, characteristics of the switching function σ will be described with reference to FIG. 6 and the equation (13). In FIG. 6, the equation (13) is shown as a line 41 on a phase plane with Vo2(k−1) being the horizontal axis and Vo2(k) being the vertical axis. The line 41 is referred to as a switching line. It is assumed that the initial value of a state variable (Vo2(k−1), Vo2(k)) that is a combination of Vo2

(k−1) and Vo2(k) is shown by a point 42. The sliding mode control operates to place the state variable shown by the point 42 on the line 41 and then restrain it on the line 41. According to the sliding mode control, since the state variable is held on the switching line 41, the state variable can highly stably converge to the origin 0 of the phase plane without being affected by disturbances or the like. In other words, by confining the state variable (Vo2(k−1), Vo2(k)) on such a stable system having no input as shown by the equation (13), the sensor output error Vo2 can converge to zero robustly against disturbances and modeling errors.

The switching function setting parameter "s" is a parameter which can be variably selected. Reduction (convergence) characteristics of the sensor output error Vo2 can be specified by the setting parameter "s."

Figure 7:
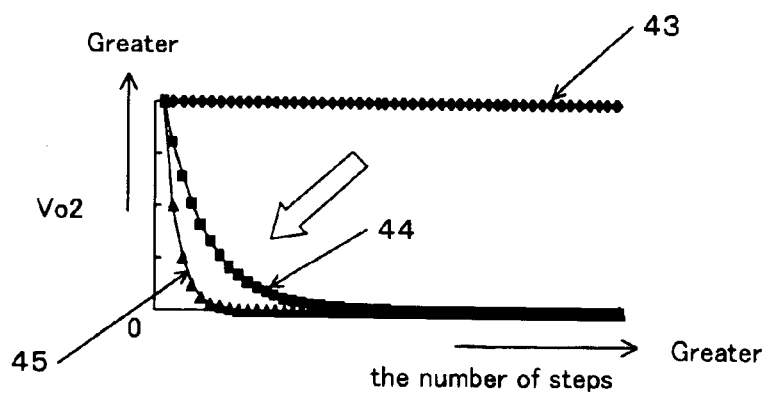
FIG. 7 shows response characteristics of response assignment control according to one embodiment of the present invention.

FIG. 7 shows one example of response assignment characteristics of the sliding mode control. A line 43 shows a case in which the value of the setting parameter is "1." A curve 44 shows a case in which the value of the setting parameter is "0.8." A curve 45 shows a case in which the value of the setting parameter is "0.5." As seen from the figure, the rate of convergence of the sensor output error Vo2 changes according to the value of the setting parameter "s." It is seen that the convergence rate becomes faster as the absolute value of "s" becomes smaller.

Three control inputs are determined to cause the value of the switching function σ to converge to zero. That is, a control input Ueq for confining the state variable on the switching line, a control input Urch for placing the state variable on the switching line, and a control input Uadp for placing the state variable on the switching line while suppressing modeling errors and disturbances. The three control inputs Ueq, Urch and Uadp are summed to determine a demand error Usl. The demand error Usl is used to calculate the air-fuel ratio error kcmd.

The equivalent control input Ueq needs to satisfy the equation (14) because it is an input for restraining the state variable onto the switching line.

$$\sigma(k+1)=\sigma(k) \qquad (14)$$

The equivalent control input Ueq that satisfies σ(k+1)=σ(k) is determined from the equations (4), (5) and (12), as shown by the equation (15).

$$Ueq(k) = -\frac{1}{b1}[((a1-1)+s) \cdot Vo2(k+d) + (a2-s) \cdot Vo2(k+d-1)] \qquad (15)$$

The reaching law input Urch has a value that depends on the value of the switching function σ. The reaching law Urch is determined in accordance with the equation (16). In the embodiment, the reaching law input Urch has a value proportional to the value of the switching function σ. Krch indicates a feedback gain of the reaching law, which is predetermined with, for example, simulation in which the stability and quick response of convergence of the value of the switching function to zero (σ=0) are taken into consideration.

$$Urch(k) = -\frac{1}{b1} \cdot Krch \cdot \sigma(k+d) \qquad (16)$$

The adaptive law input Uadp has a value that depends on an integrated value of the switching function σ. The adaptive law input Uadp is determined in accordance with the equation (17). In the embodiment, the adaptive law input Uadp has a value proportional to the integrated value of the switching function σ. Kadp indicates a feedback gain of the adaptive law, which is predetermined with, for example, simulation in which the stability and quick response of convergence of the value of the switching function to zero (σ=0) are taken into consideration. =66 T indicates the period of a control cycle.

$$Uadp(k) = -\frac{1}{b1} \cdot Kadp \cdot \sum_{i=0}^{k+d}(\sigma(i) \cdot \Delta T) \qquad (17)$$

Since the sensor output errors Vo2(k+d) and Vo2(k+d−1), and the value σ(k+d) of the switching function include the dead time "d", these values can not be directly obtained. Therefore, the equivalent control input Ueq is determined using an estimated errors $\overline{Vo2}(k+d)$ and $\overline{Vo2}(k+d-1)$ generated by the estimator 33.

$$Ueq(k) = -\frac{1}{b1}[((a1-1)+s) \cdot \overline{Vo2}(k+d) + (a2-s) \cdot \overline{Vo2}(k+d-1)] \qquad (18)$$

A switching function $\overline{\sigma}$ is determined using the estimated errors generated by the estimator 33, as shown in the equation (19).

$$\overline{\sigma}=s \cdot \overline{Vo2}(k-1)+\overline{Vo2}(k) \qquad (19)$$

The switching function $\overline{\sigma}$ is used to determine the reaching law input Urch and the adaptive law input Uadp.

$$Urch(k) = -\frac{1}{b1} \cdot Krch \cdot \overline{\sigma}(k+d) \qquad (20)$$

$$Uadp(k) = -\frac{1}{b1} \cdot Kadp \cdot \sum_{i=0}^{k+d}(\overline{\sigma}(i) \cdot \Delta T) \qquad (21)$$

As shown by the equation (22), the equivalent control input Ueq, the reaching law input Urch and the adaptive law input Uadp are added to determine a demand error Usl.

$$Usl(k)=Ueq(k)+Urch(k)+Uadp(k) \qquad (22)$$

The limiter 35 performs a limiting process for the demand eror Usl to determine the air-fuel ratio error kcmd. More specifically, if the demand error Usl is within an allowable range, the limiter 35 sets the air-fuel ratio error kcmd to the value of the demand error Usl. If the demand error Usl deviates from the allowable range, the limiter 35 sets the air-fuel ratio error kcmd to an upper or lower limit value of the allowable range.

As shown by reference number 29 in FIG. 3, the allowable range used by the limiter 35 is set to a range whose center is almost located in the window 27 and whose width is wider than that of the window 27. The allowable range is actively established in accordance with the demand error Usl, the operating state of the engine and the like. Even when the purification capability of the catalyst converter deviates from the optimal state shown by the window 27, the allowable range has a sufficient width to allow the catalyst converter to quickly return to the optimal state while suppressing variations in combustion conditions that may be caused by variations in the air-fuel ratio. Therefore, the purification rate of the catalyst converter can be kept at high level so that deleterious substances of exhaust gas are reduced.

More specifically, the allowable range is variably updated in accordance with the determined demand error Usl. For example, the allowable range is extended in accordance with deviation of the demand error Usl from the allowable range. On the other hand, when the demand error Usl is within the allowable range, the allowable range is reduced. Thus, the allowable range suitable for the demand error Usl, which defines the air-fuel ratio necessary to cause the output of the O2 sensor 17 to converge to the target value, is established.

Furthermore, the allowable range is established to be narrower as the degree of instability of the output of the O2 sensor 17 becomes higher. The allowable range may be established in accordance with the operating state of the engine including an engine start, an idling state, and cancellation of a fuel cut.

The determined air-fuel ratio error kcmd is added to the base value FLAF/BASE to determine the target air-fuel ratio KCMD. The target air-fuel ratio KCMD is given to the exhaust system 19 (that is the object to be controlled), thereby causing the sensor output error Vo2 to converge to zero.

Alternatively, the base value FLAF/BASE of the air-fuel ratio may be updated in accordance with the adaptive law input Uadp determined by the sliding mode controller 34 after the completion of the limiting process by the limiter 35. More specifically, the base value FLAF/BASE is initialized to the stoichiometric air-fuel ratio. If the adaptive law input Uadp exceeds a predetermined upper limit value, the base value FLAF/BASE is increased by a predetermined amount. If the adaptive law input Uadp is below a predetermined lower limit value, the base value FLAF/BASE is decreased by a predetermined amount. If the adaptive law input Uadp is between the upper and lower limit values, the base value FLAF/BASE is not updated. The base value FLAF/BASE thus updated is used in the next control cycle. Thus, the base value FLAF/BASE is adjusted to be a central value for the target air-fuel ratio KCMD.

By performing the above updating process of the base value FLAF/BASE in combination with the limiting process, the allowable range of the demand error Usl is balanced between positive and negative values. It is preferable that the updating process for the base value FLAF/BASE is performed when it is determined that the output Vo2/OUT of the O2 sensor substantially converges to the target value Vo2/TARGET and that the sliding mode control is in a stable state.

First Decimation Filter

Figure 8:
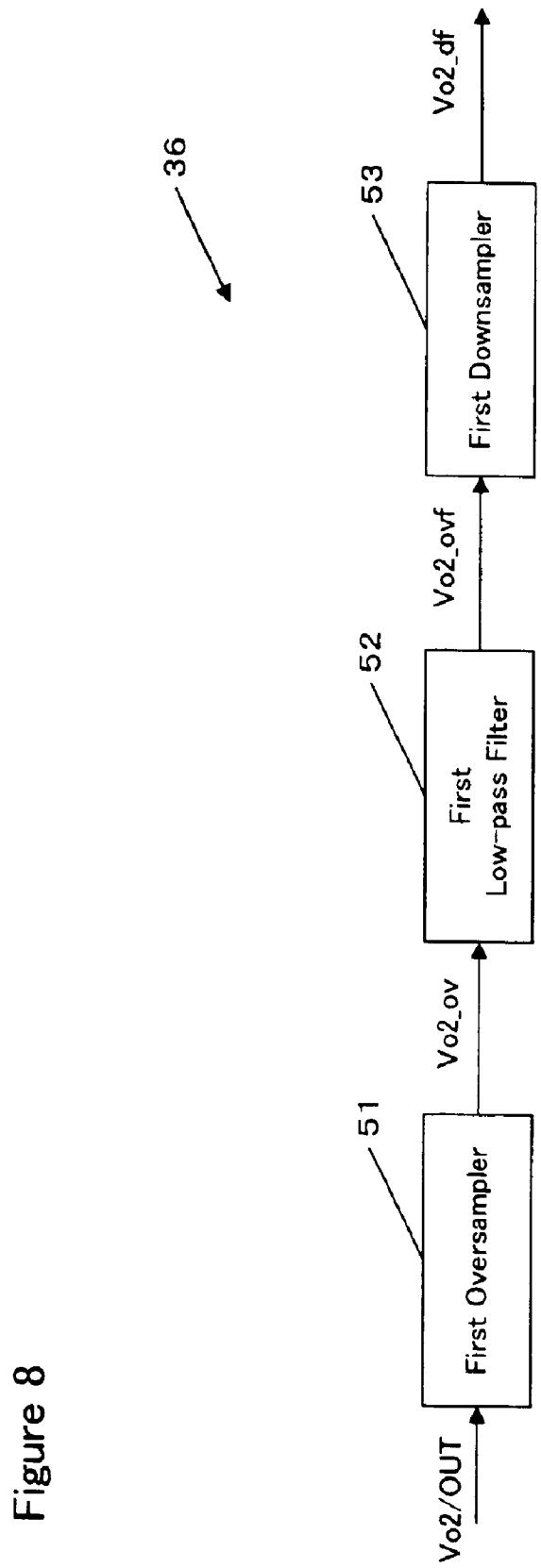
FIG. 8 is a detailed functional block diagram of a first decimation filter according to one embodiment of the present invention.

FIG. 8 is a block diagram of the first decimation filter 36. A first oversampler 51 oversamples the O2 sensor output Vo2/OUT in a shorter cycle "n" than the control cycle "k" that is used for calculating the manipulated variable Usl for manipulating the air-fuel ratio (that is, "k" is the control cycle shown in the above equations). The cycle "n" for the oversampling process is, for example, one-fifth of the control cycle "k." The oversampled value Vo2_ov is provided to a first low-pass filter 52.

The first low-pass filter 52 performs a filtering process on the oversampled value Vo2_ov in accordance with the equation (23) to output Vo2_ovf. In the equation (23), a1ovf, a2ovf, a3ovf, b0ovf, b1ovf, b2ovf and b3ovf are filtering coefficients that are predetermined with simulation or the like.

$$Vo2\_ovf(n) = a1ovf \cdot Vo2\_ovf(n-1) + \\ a2ovf \cdot Vo2\_ovf(n-2) + a3ovf \cdot Vout\_ovf(n-3) + \\ b0ovf \cdot Vo2\_ov(n) + b1ovf \cdot Vo2\_ov(n-1) + \\ b2ovf \cdot Vo2\_ov(n-2) + b3ovf \cdot Vo2\_ov(n-3)$$ (23)

A first downsampler 53 re-samples the filtered value Vo2_ovf in the control cycle "k" to output a sample value Vo2_df.

A method for detecting deterioration of the catalyst based on the O2 sensor output in a certain frequency regions has been proposed. It is preferable that the first low-pass filter is designed without invalidating such detection of the catalyst deterioration.

Figure 9:
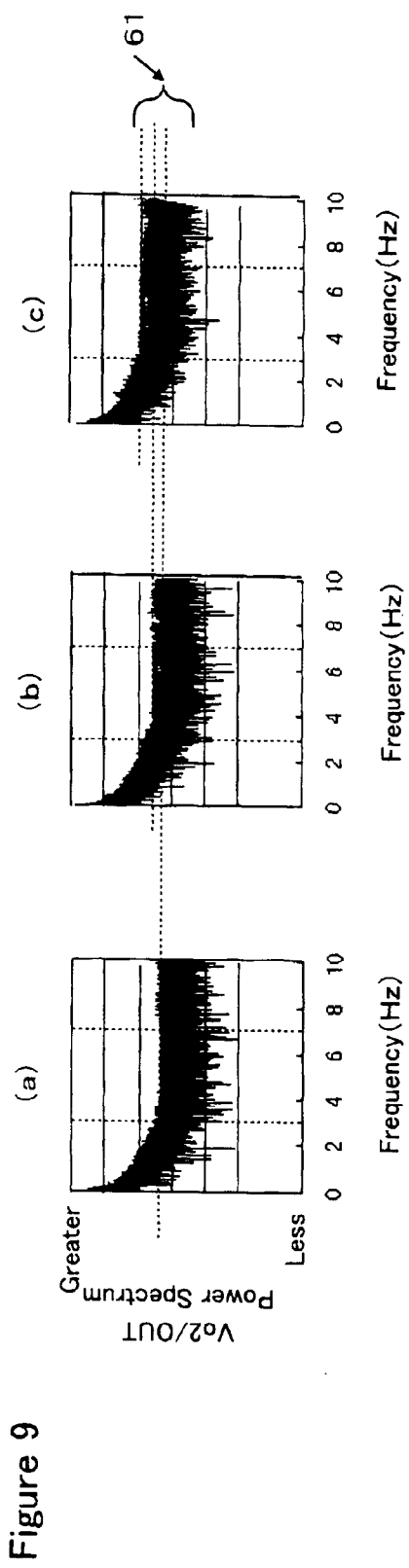
FIG. 9 shows a frequency response of an output of an exhaust gas sensor that varies according to the degree of deterioration of catalyst.
Figure 10:
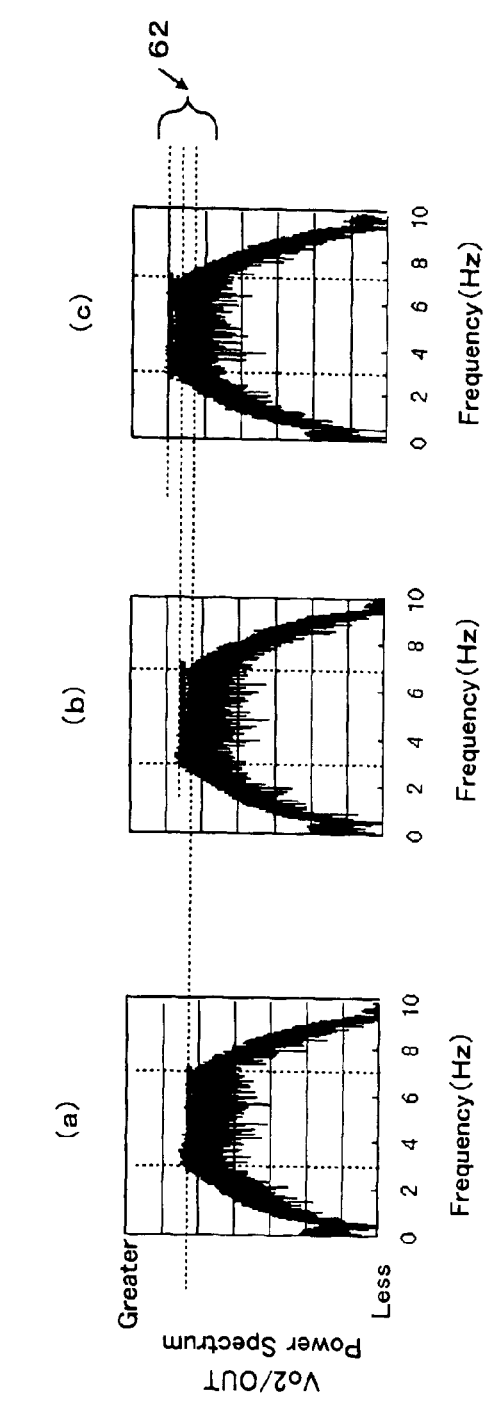
FIG. 10 shows a frequency response of a filtered output of an exhaust gas sensor that varies according to the degree of deterioration of catalyst.

With reference to FIGS. 9 and 10, a frequency region required to detect deterioration of the catalyst will be described. FIG. 9 shows a power spectrum of the O2 sensor output Vo2/OUT (a) when the catalyst is new, (b) when the purification rate of the catalyst is sufficient, and (c) when the purification rate of the catalyst is insufficient. As seen from FIGS. 9(a) through 9(c), the level of the power spectrum of the sensor output Vo2/OUT in the frequency region of 3 through 7 Hz varies, which is indicated by reference number 61.

FIGS. 10(a) through 10(c) show a result of filtering the sensor output Vo2/OUT shown in FIGS. 9(a) through 9(c) with a band-pass filter, respectively. The power spectrum of the sensor output Vo2/OUT in the frequency region of 3 through 7 Hz is emphasized by the filter. As shown by reference number 62, as the catalyst deteriorates, the power spectrum of the sensor output Vo2/OUT in the frequency regions 3 through 7 Hz increases. Thus, by evaluating the sensor output Vo2/OUT in the frequency region of 3 through 7 Hz, it can be determined whether the catalyst is in a deteriorated state. In order to detect deterioration of the catalyst, the first low-pass filter 52 is preferably designed not to cut the frequency region of 3 through 7 Hz.

Figure 11:
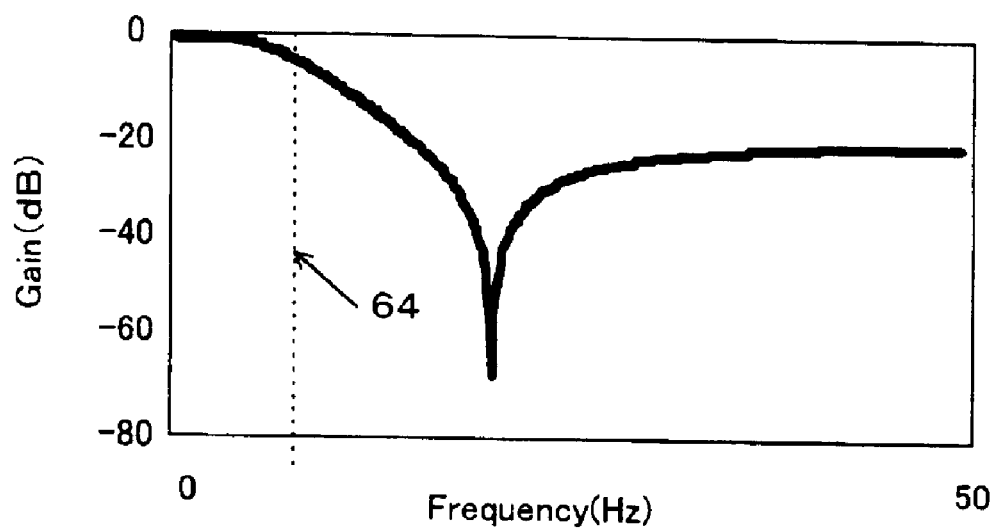
FIG. 11 shows low-pass filter characteristics of a first decimation filter according to one embodiment of the present invention.
Figure 11:
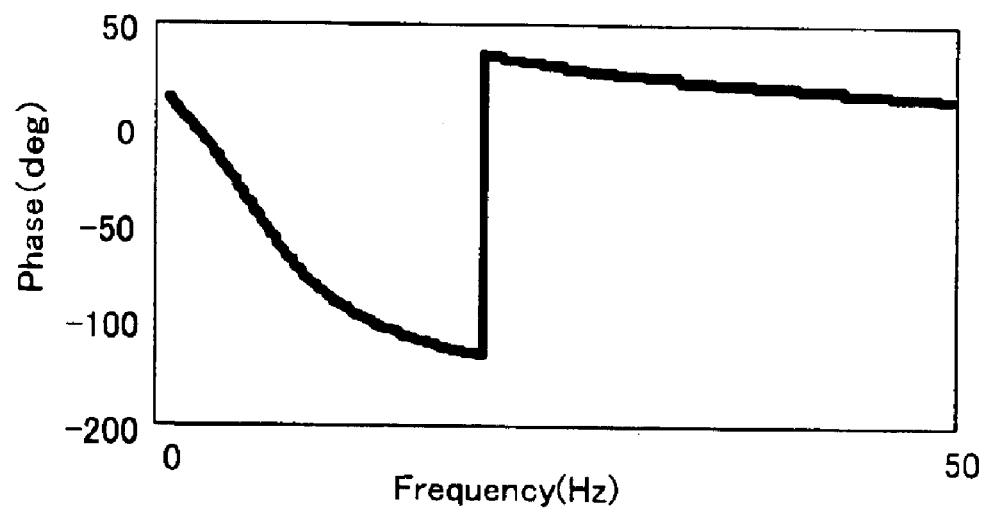

FIG. 11 shows filter characteristics of the first low-pass filter 52. Frequency components necessary to detect deterioration of the catalyst exist in a frequency region lower than the line indicated by reference number 64. The cut-off frequency is set at a frequency sufficiently higher than the frequency required for detecting deterioration of the catalyst. Thus, the first low-pass filter 52 does not reduce the accuracy of detecting the catalyst deterioration.

Effect of the Use of the First Decimation Filter

Figure 12:
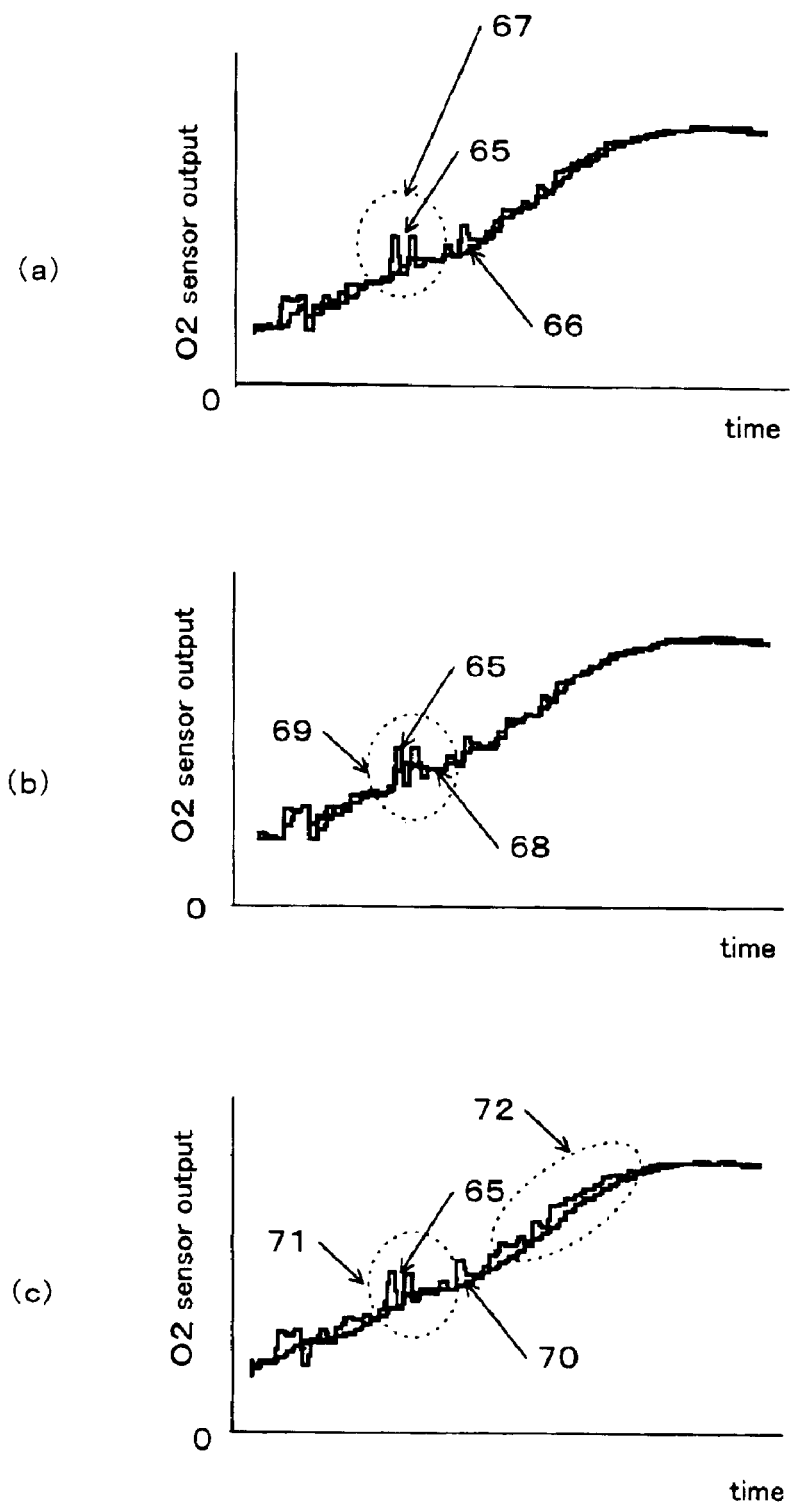
FIG. 12 shows a filtered output of an exhaust gas sensor (a) when a first decimation filter is used, and (b)(c) when another filter is used, according to one embodiment of the present invention.

FIG. 12(a) shows one example of the O2 sensor output 65 sampled in the control cycle "k" in accordance with one embodiment of the present invention. In the example, the O2 sensor whose response is enhanced was used. FIG. 12(a) also shows the output Vo2_df 66 from the first decimation filter that has the filter characteristics shown in FIG. 11. A large variation due to chemical noise appears in the O2 sensor output 65, as shown in the area 67. Such large variation due to chemical noise is removed from the output Vo2_df of the first decimation filter.

Figure 13:
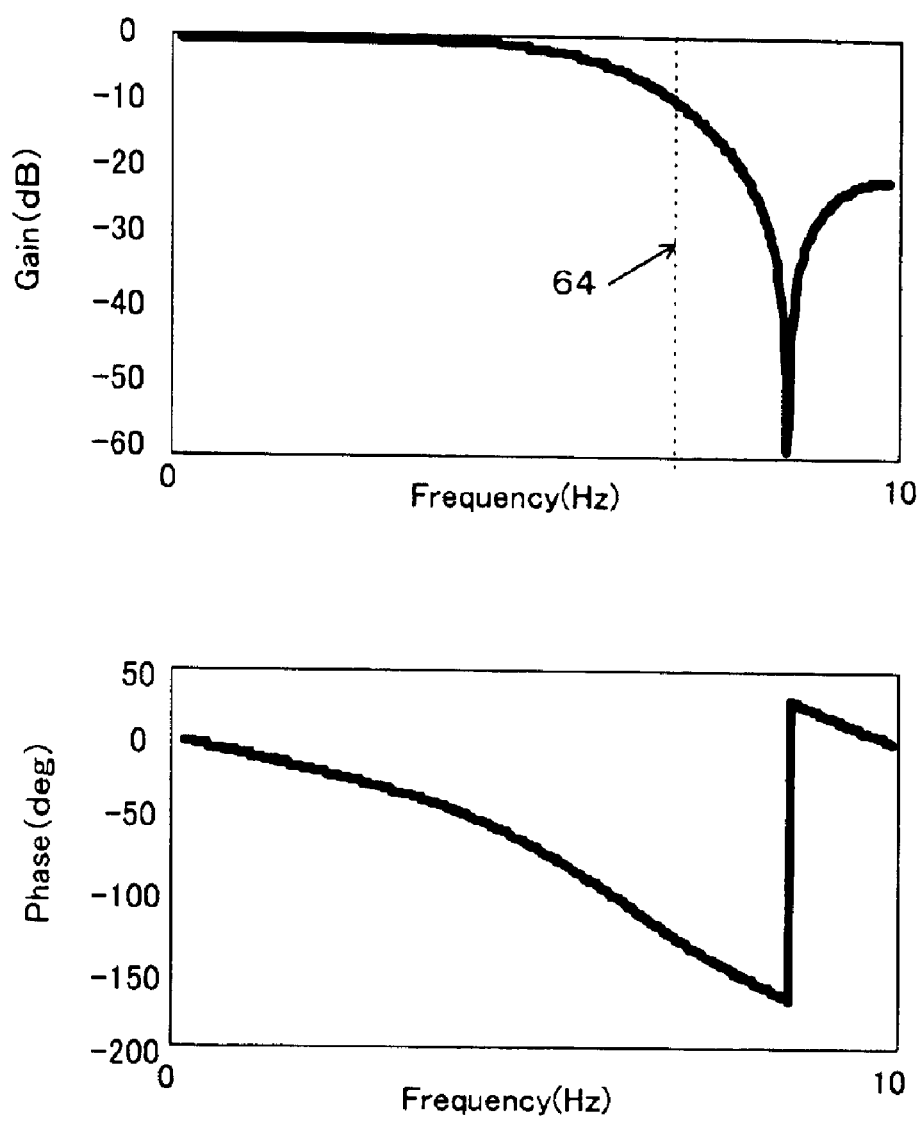
FIG. 13 shows low-pass filter characteristics of a filter that is used in the case (b) of FIG. 12.

The O2 sensor output 65 shown in FIG. 12(b) is the same as that shown in FIG. 12(a). A graph 68 shows Vo2_f obtained by filtering the output of the O2 sensor with a low-pass filter that has filter characteristics shown in FIG. 13. As shown in FIG. 13, the low-pass filter has a higher cut-off frequency than the frequency required for detecting deterioration of the catalyst. Therefore, the accuracy of detecting deterioration of the catalyst is not reduced. It should be noted that the low-pass filter is applied to the O2 sensor output that has not been oversampled.

As shown in the area 69, a large variation occurs in the filtered value Vo2_f in accordance with the large variation in the O2 sensor output 65 caused by chemical noise (although the figure may be hard to see, a variation in a convex shape appears in the filtered value Vo2_f in accordance with the variation in the O2 sensor output). Thus, in the example shown in FIG. 12(b), chemical noise included in the O2 sensor output cannot be removed.

Figure 14:
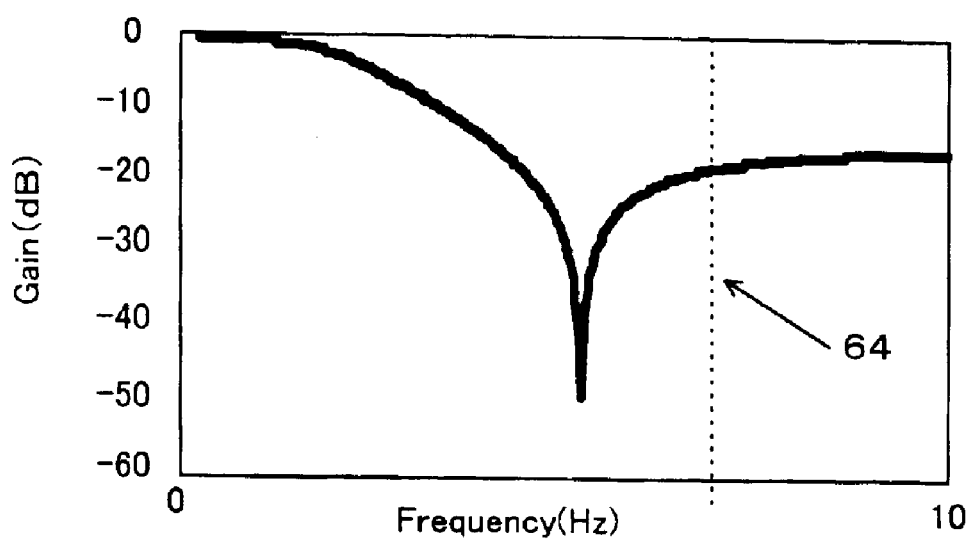
FIG. 14 shows low-pass filter characteristics of a filter that is used in the case (c) of FIG. 12.
Figure 14:
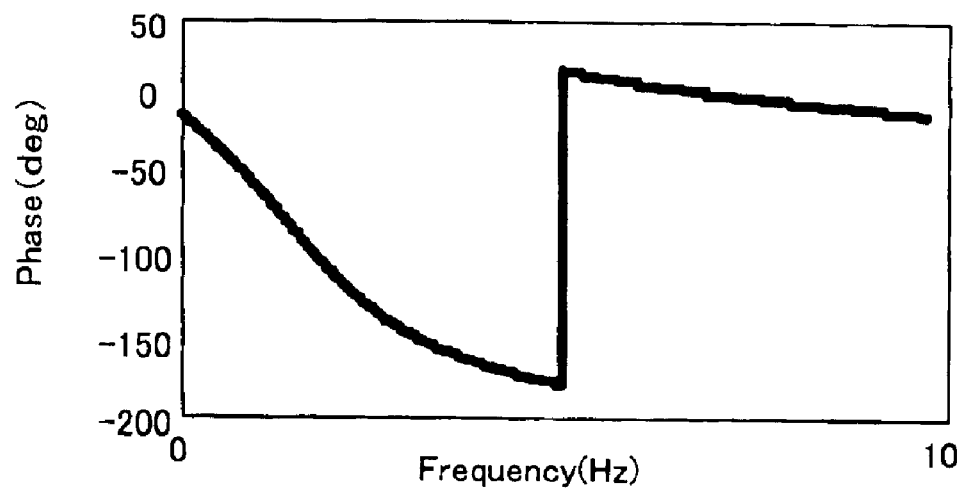

The O2 sensor output 65 shown in FIG. 12(c) is the same as that shown in FIG. 12(a). The graph 70 shows Vo2_f obtained by filtering the output of the O2 sensor with a low-pass filter that has filter characteristics shown in FIG. 14. The low-pass filter has a lower cut-off frequency than the frequency required for detecting the deterioration of the catalyst, as shown in FIG. 14. Therefore, the low-pass filter may reduce the accuracy of detecting deterioration of the catalyst. The low-pass filter is applied to the O2 sensor output that has not been oversampled.

As shown in the area 71, although a large variation occurs in the O2 sensor output 65 due to chemical noise, there is little variation in the filtered value Vo2_f. The filtered value Vo2_f has a large phase delay relative to the O2 sensor output, as clearly seen in the area 72. In the example shown in FIG. 12(c), not only the accuracy of detecting deterioration of the catalyst deteriorates, but also the effect of the improved response of the O2 sensor is invalidated.

Thus, the first decimation filter can remove chemical noise that appears in the sensor output Vo2/OUT without causing a phase delay.

Figure 15:
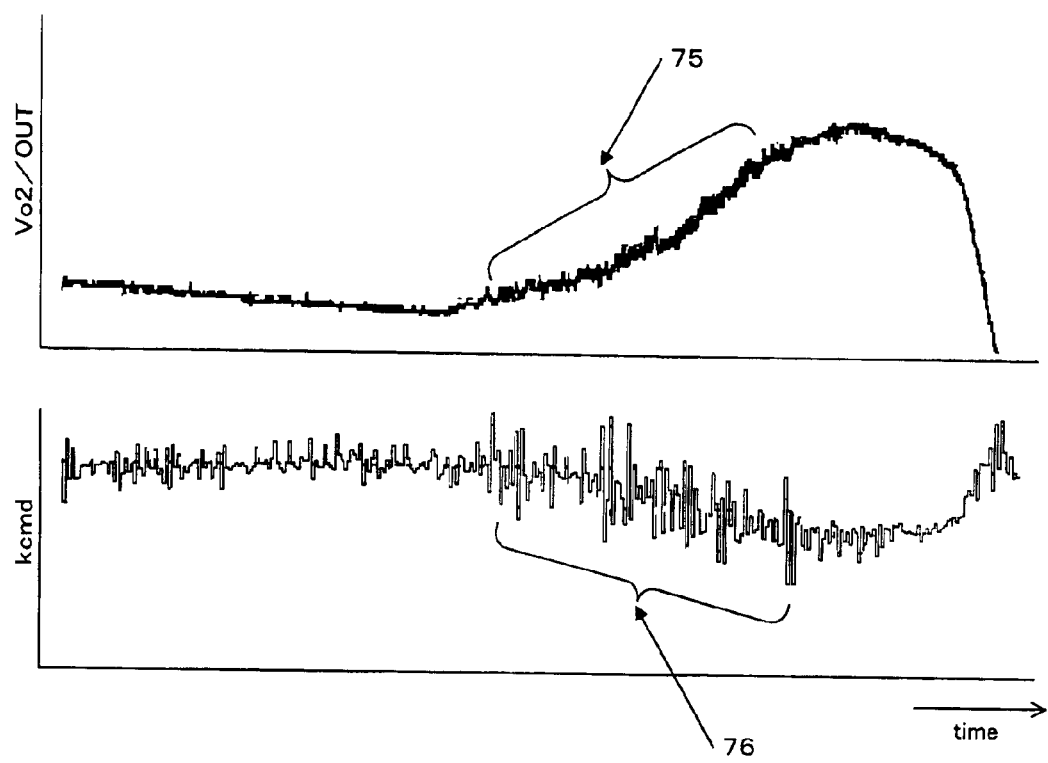
FIG. 15 shows an appearance of chemical noise in the exhaust gas sensor output, and variations in the target air-fuel ratio error kcmd according to conventional air-fuel ratio control.

FIG. 15 shows one example of the exhaust gas sensor output Vo2/OUT and the target air-fuel ratio error "kcmd" in accordance with conventional air-fuel ratio control. In the example, the O2 sensor whose response is enhanced was used. As shown by reference number 75, high-frequency chemical noise appears in the sensor output, which is caused by the improved response of the O2 sensor. As shown by reference number 76, such chemical noise causes a large variation in the target air-fuel ratio error kcmd. Such a large variation in the target air-fuel ratio error kcmd may reduce the purification rate of the catalyst because the actual air-fuel ratio of the exhaust gas flowing into the catalyst varies according to the target air-fuel ratio error kcmd.

Figure 16:
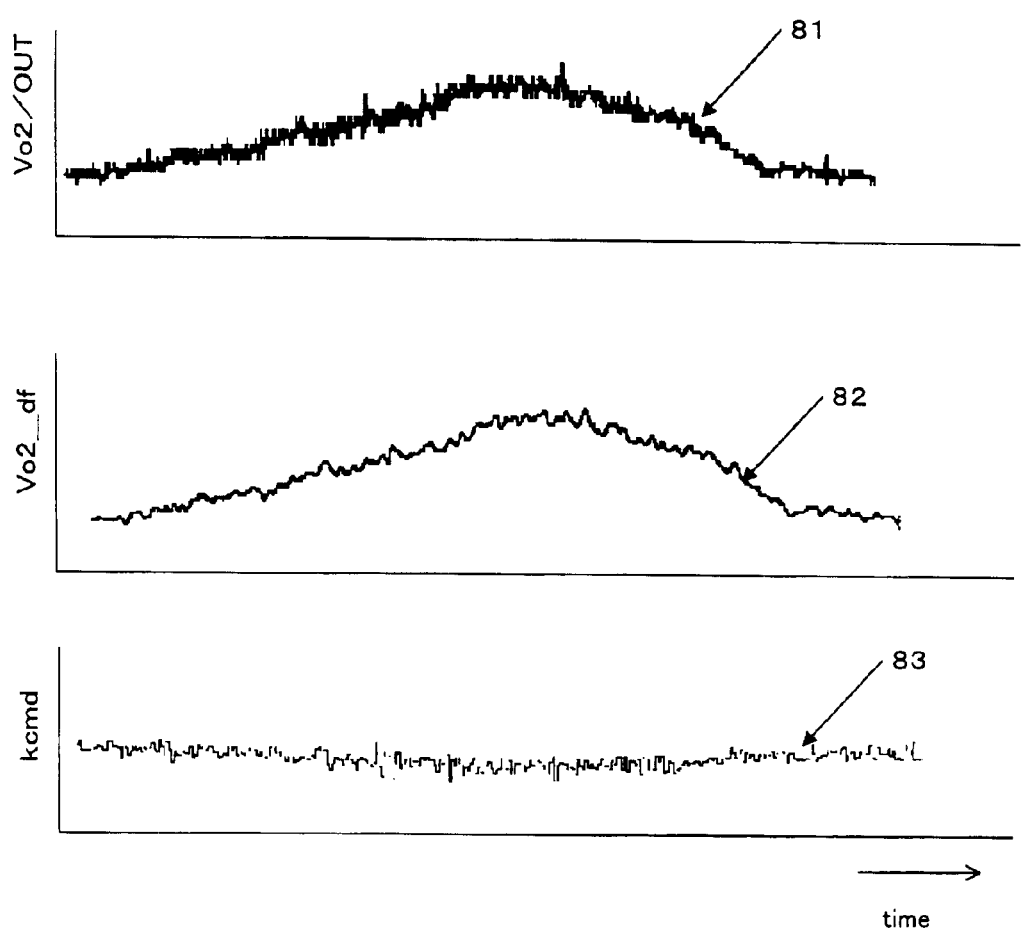
FIG. 16 shows the output of the first decimation filter Vo2_df and the target air-fuel ratio error kcmd according to one embodiment of the present invention.

In FIG. 16, reference number 81 shows the exhaust gas sensor output V02/OUT, reference number 82 shows the first decimation filter output V02_df, and reference number 83 shows the target air-fuel ratio error kcmd, in accordance with one embodiment of the present invention. In the example, the O2 sensor whose response is enhanced was used. High-frequency chemical noise appears in the sensor output V02/OUT. Such chemical noise is removed as shown in the first decimation filter output Vo2_df. The use of the first decimation filter output Vo2_df makes the target air-fuel ratio error kcmd stable.

Adaptive Air-fuel Ratio Control in Accordance with a Second Embodiment

Figure 17:
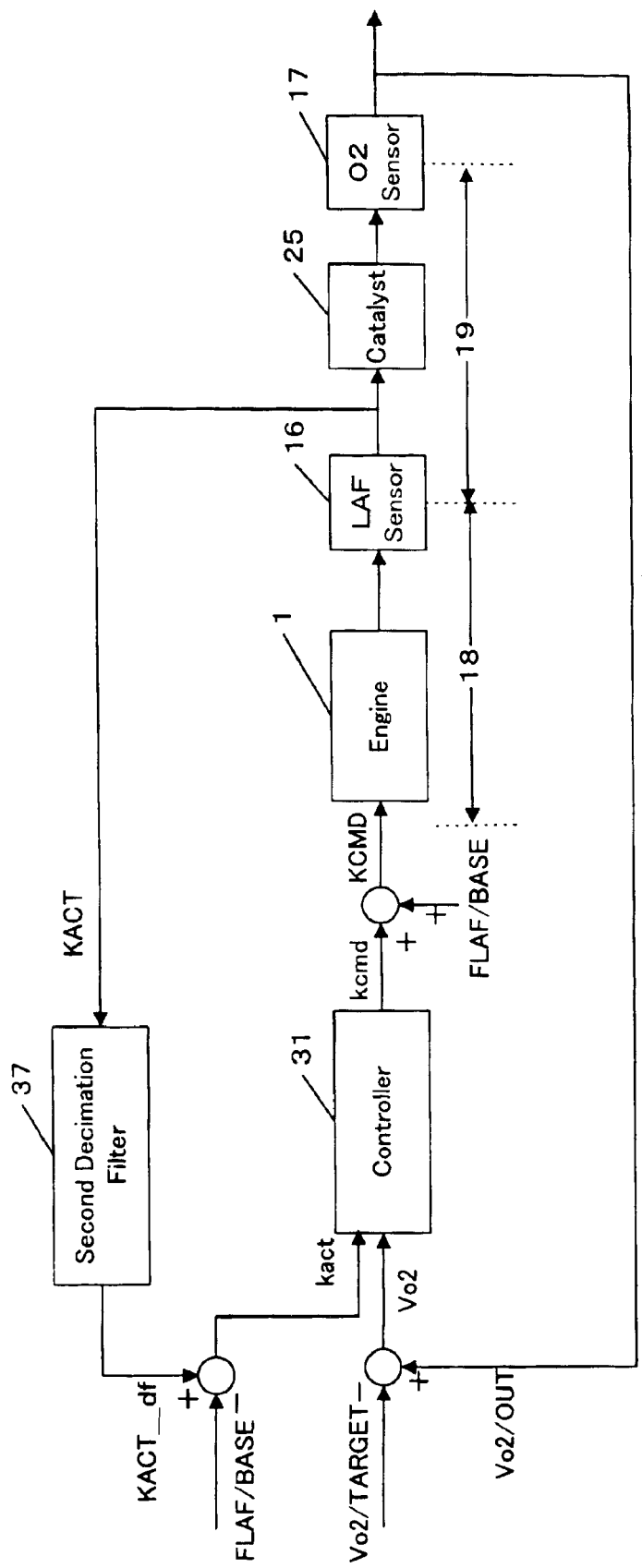
FIG. 17 is a block diagram of air-fuel ratio control according to a second embodiment of the present invention.

FIG. 17 shows a block diagram of adaptive air-fuel ratio control in accordance with a second embodiment of the present invention. The second embodiment differs from the first embodiment in that the first decimation filter 36 is removed and in that a second decimation filter 37 is provided.

The output Vo2/OUT of the O2 sensor 17 is compared with a target value Vo2/TARGET. An error Vo2 between the sensor output Vo2/OUT and the target value Vo2/TARGET is provided to the controller 31.

The output KACT of the LAF sensor 16 is delivered to the second decimation filter 37. The second decimation filter 37 oversamples the actual air-fuel ratio KACT, filters the oversampled value by a low-pass filtering process, and then downsamples the filtered value to output a sample value KACT_df. The sample value KACT_df is compared with the target value FLAF/BASE. An error "kact" between the sample value KACT_df and the target value FLAF/BASE is provided to the controller 31.

An exhaust system 19, which is an object to be controlled, can be modeled as shown by the equation (24), in which Vo2/OUT is defined as a control output and the output KACT of the LAF sensor is defined as a control input.

$$Vo2(k+1)=a1\cdot Vo2(k)+a2\cdot Vo2(k-1)+b1\cdot kact'(k-d3) \text{ where } Vo2(k)= Vo2/OUT(k)-Vo2/TARGET\ kact'(k)=KACT(k)-FLAF/BASE \quad (24)$$

The sensor output error Vo2 indicates an error between the O2 sensor output Vo2/OUT and the target value Vo2/TARGET. An actual air-fuel ratio error kact' indicates an error between the LAF sensor output KACT and the base value FLAF/BASE.

"d3" indicates a dead time in the exhaust system 19. a1, a2 and b1 are model parameters generated by the above-described identifier.

Relation between the LAF sensor output KACT and the second decimation filter output KACT_df is expressed as shown by the equation (25).

$$KACT(k)=KACT\_df(k+d6) \quad (25)$$

"d6" indicates a dead time in the second decimation filter 37. The dead time d6 indicates a time required for the LAF sensor output KACT to be oversampled, filtered by the low-pass filtering process, and then dwonsampled. The dead time d6 is, for example, one control cycle (that is, d6=1).

A system comprising the exhaust system 19 and the second decimation filter 37 can be obtained from the equations (24) and (25), as shown by the equation (26).

$$\begin{aligned} Vo2(k+1) &= a1\cdot Vo2(k) + a2\cdot Vo2(k-1) + \\ &\quad b1\cdot kact(k-d3+d6) \\ &= a1\cdot Vo2(k) + a2\cdot Vo2(k-1) + b1\cdot kact(k-d1) \end{aligned} \quad (26)$$

where $$Vo2(k) = Vo2/OUT(k) - Vo2/TARGET$$
$$kact(k) = KACT\_df(k) - FLAF/BASE\ d1 = d3 - d6$$

Thus, incorporation of the second decimation filter 37 decreases the dead time in the exhaust system.

On the other hand, the air-fuel ratio manipulating system 18 extending from the ECU 5 through the engine 1 to the LAF sensor 16 can be modeled as shown by the equation (27).

$$kact'(k)=kcmd(k-d4) \text{ where } kact'(k)=KACT(k)-FLAF/BASE\ kcmd(k)=KCMD(k)-FLAF/BASE \quad (27)$$

The target air-fuel ratio error "kcmd" indicates an error between the target air-fuel ratio KCDM and the base value FLAF/BASE. "d4" indicates a dead time in the air-fuel ratio manipulating system 18.

A system comprising the air-fuel ratio manipulating system 18 and the second decimation filter 37 can be obtained from the equations (25) and (27), as shown by the equation (28).

$$\begin{aligned} kact(k) &= kcmd(k-d4-d6) \\ &= kcmd(k-d2) \end{aligned} \quad (28)$$

where $kact(k) = KACT\_df(k) - FLAF/BASE$ $$kcmd = KCMD - FLAF/BASE\ d2 = d4 + d6$$

Thus, incorporation of the second decimation filter 37 increases the dead time in the air-fuel ratio manipulating system.

The air-fuel ratio manipulating system 18 may be included in the object to be controlled by the adaptive air-fuel ratio control. In this case, the model equation for the controlled object is expressed based on the equations (26) and (28), as shown by the equation (29). The dead time "d" is a total dead time in a system comprising the air-fuel ratio manipulating system 18, the exhaust system 19, and the second decimation filter 37.

$$Vo2(k+1) = a1 \cdot Vo2(k) + a2 \cdot Vo2(k-1) + \quad (29)$$
$$b1 \cdot kcmd(k - d1 - d2)$$
$$= a1 \cdot Vo2(k) + a2 \cdot Vo2(k-1) + b1 \cdot kcmd(k-d)$$
$$\text{where } d = d1 + d2 = d3 - d6 + d4 + d6 = d3 + d4$$

Thus, the dead time in the system comprising the air-fuel ratio manipulating system 18, the exhaust system 19, and the second decimation filter 37 is equal to a sum of the dead time d3 in the exhaust system 19 and the dead time d4 in the air-fuel ratio manipulating system 18. The dead time d6 in the second decimation filter has no influence on the system.

The structure of the controller 31 in the second embodiment is the same as that in the first embodiment. The dead time d1, d2 and d shown in the above equations regarding the identifier 32, the estimator 33 and the sliding mode controller 34 of the controller 31 are (d3−d6), (d4+d6) and (d3+d4), respectively.

Second Decimation Filter

Figure 18:
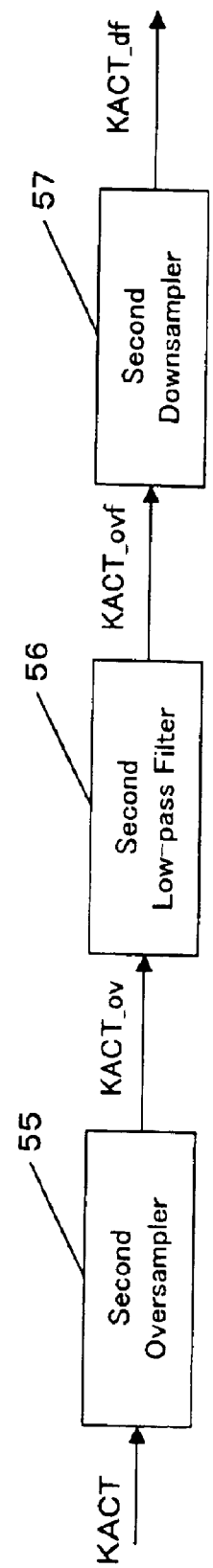
FIG. 18 is a detailed functional block diagram of a second decimation filter according to one embodiment of the present invention.

FIG. 18 is a block diagram of the second decimation filter 37. A second oversampler 55 oversamples the LAF sensor output KACT in a shorter cycle "n" than the control cycle k that is used for calculating the manipulated variable Usl for the air-fuel ratio control (that is, "k" is the control cycle used in the above equations). The cycle "n" for the oversampling process is, for example, one-fifth of the control cycle "k." The oversampled value KACT_ov is provided to a second low-pass filter 56.

Figure 19:
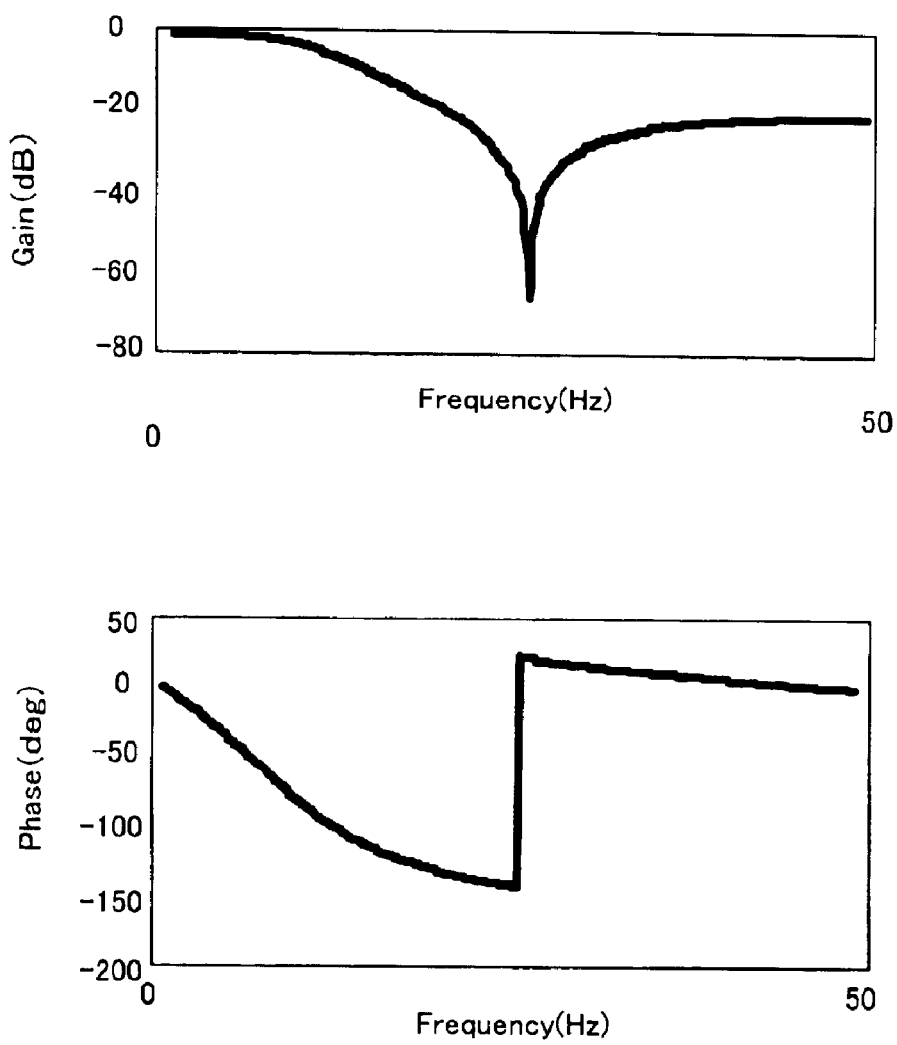
FIG. 19 shows low-pass filter characteristics of a second decimation filter according to one embodiment of the present invention.

The second low-pass filter 56 filters the oversampled value KACT_ov in accordance with the equation (30) to output KACT_ovf. In the equation (30), a1ovf', a2ovf', a3ovf', b0ovf', b1ovf', b2ovf' and b3ovf' are filter coefficients predetermined with simulation or the like. Filter characteristics of the second low-pass filter 56 is shown in FIG. 19.

$$KACT\_ovf(n) = a1ovf' \cdot KACT\_ovf(n-1) + \quad (30)$$
$$a2ovf' \cdot KACT\_ovf(n-2) + a3ovf' \cdot KACT\_ovf(n-3) +$$
$$b0ovf' \cdot KACT\_ov(n) + b1ovf' \cdot KACT\_ov(n-1) +$$
$$b2ovf' \cdot KACT\_ov(n-2) + b3ovf' \cdot KACT\_ov(n-3)$$

A second downsampler 57 re-samples the filtered value KACT_ovf in the control cycle "k" to output a sample value KACT_df.

Effect of the Use of the Second Decimation Filter

Figure 20:
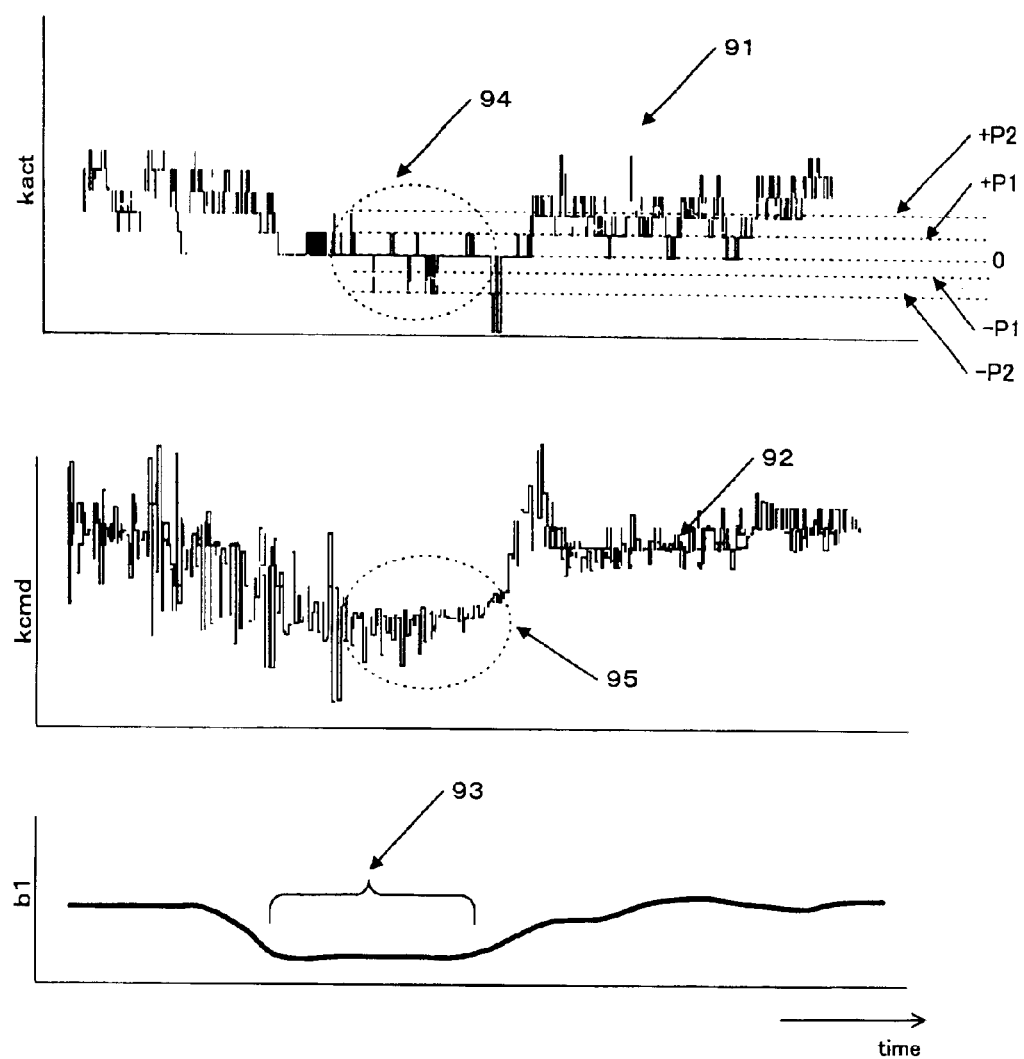
FIG. 20 shows a shortage of resolution of an air-fuel ratio (LAF) sensor, the target air-fuel ratio error kcmd, and an identified parameter "b1" according to conventional air-fuel ratio control.

In FIG. 20, reference number 91 shows the actual air-fuel ratio error kact detected by the LAF sensor, and reference number 92 shows the target air-fuel ratio error kcmd calculated based on the error kact in accordance with conventional air-fuel control. In the example, the LAF sensor whose detection range is expanded was used. Reference number 93 shows the model parameter b1 calculated by the identifier 32. As described above, the model parameter b1 acts to identify correlation between the air-fuel ratio error kact, which is an input of the modeled control system, and the sensor output error Vo2, which is an output of the modeled control system.

As seen, for example, in the area 94, even if the actual air-fuel ratio error kact continuously varies within a range between −P2 and +P2, the actual air-fuel ratio error kact takes one of the values of −P2, −P1, 0, +P1 and +P2 due to the low resolution of the LAF sensor. For example, an actual air-fuel ratio error that has an intermediate value between 0 and +P1 cannot be detected. The actual air-fuel ratio error kact is often detected to be continuously zero as indicated by a flat portion shown in the area 94.

If such a flat portion is detected continuously, the identifier determines that there is no correlation between the air-fuel ratio error kact and the sensor output error Vo2. If it is determined that there is no correlation, the identifier decreases the model parameter b1 as shown by reference number 93. Thus, the identification accuracy of the model parameter b1 deteriorates. When the value of the model parameter b1 becomes small, the sliding model control reaches an over-corrected state. This state increases variation in the target air-fuel ratio error kcmd, as indicated by the region 95 of the graph 92, thereby reducing the purification rate of the catalyst.

Figure 21:
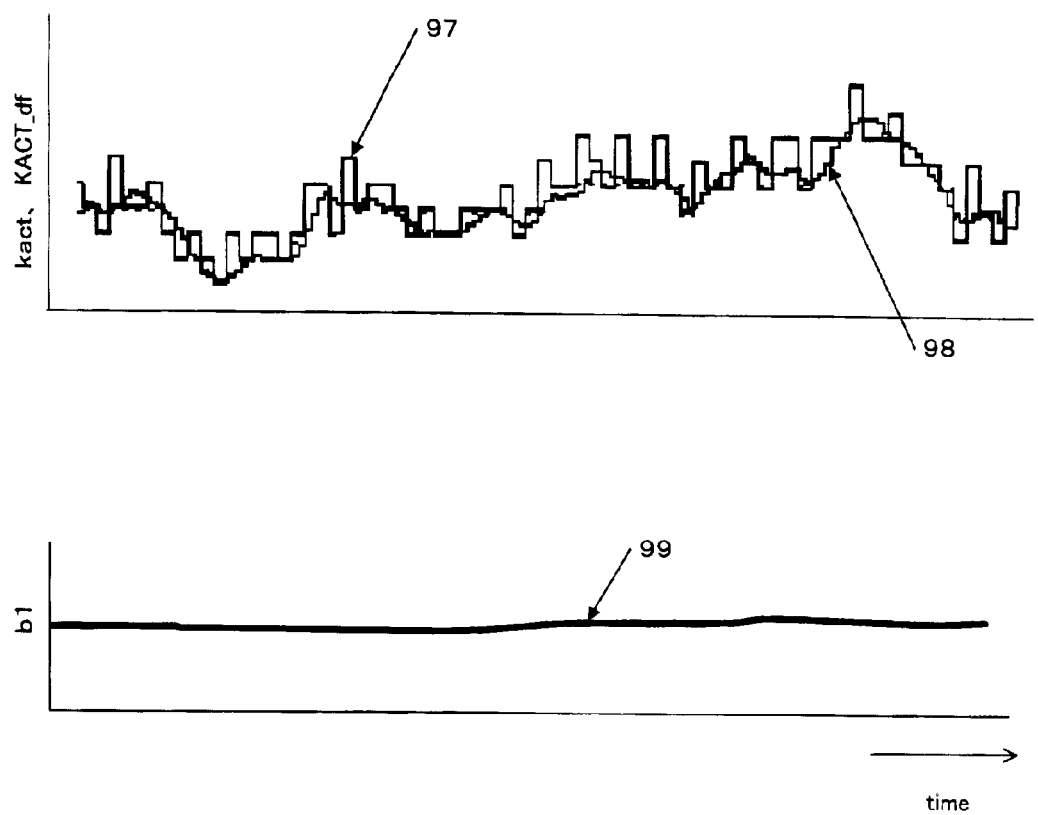
FIG. 21 shows the output of a second decimation filter KACT_df and the target air-fuel ratio error kcmd according to one embodiment of the present invention.

In FIG. 21, reference number 97 shows the actual air-fuel ratio error kact detected by the LAF sensor, and reference number 98 shows the output KACT_df from the second decimation filter 37 in accordance with the second embodiment of the present invention. The LAF sensor whose detection range is expanded was used. It is seen that values that cannot be detected by the LAF sensor (that is, values below the resolution limit of the LAF sensor) are estimated by applying the second decimation filter to the actual air-fuel ratio KACT. There is no continuous flat portion in KACT_df. Therefore, the identifier determines that there is correlation between the actual air-fuel ratio error kact and the sensor output error Vo2. The value of the identification parameter b1 becomes stable as shown by a graph 99.

Thus, the second decimation filter compensates the shortage of resolution of the LAF sensor. The cycle "n" used for the oversampling process in the second decimation filter 37 may be the same as the cycle used for the oversampling process in the first decimation filter 36. Alternatively, the cycle "n" used in the second decimation filter 37 may be different from the cycle used in the first decimation filter 36.

Adaptive Air-fuel Ratio Control in Accordance with a Third Embodiment

Figure 22:
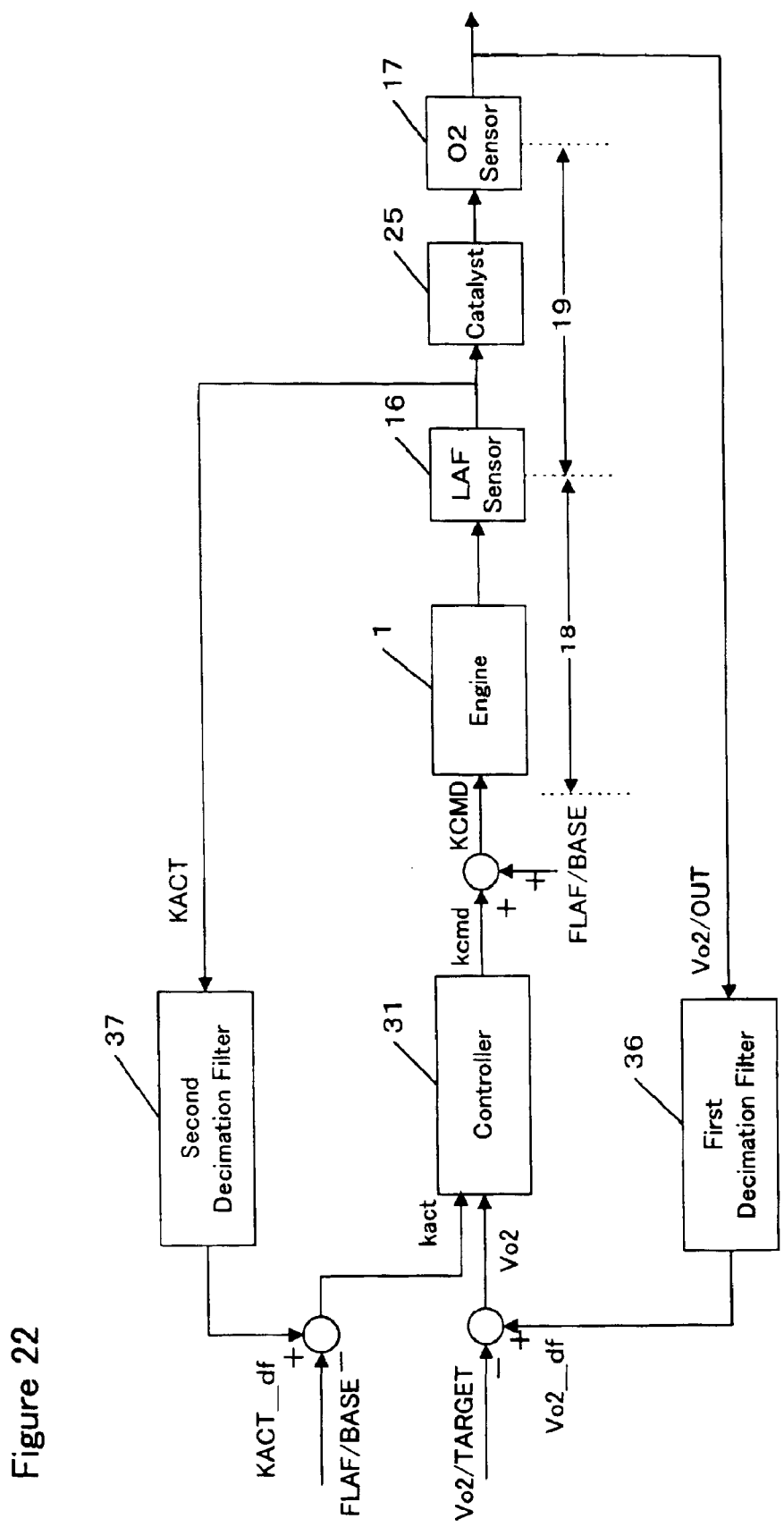
FIG. 22 is a block diagram of air-fuel ratio control according to third embodiment of the present invention.

FIG. 22 shows a block diagram of adaptive air-fuel ratio control in accordance with a third embodiment of the present invention. In the third embodiment, both of the first decimation filter 36 and the second decimation filter 37 are provided.

The output Vo2/OUT of the O2 sensor 17 is delivered to the first decimation filter 36. The output Vo2_df from the first decimation filter 36 is compared with the target value Vo2/TARGET. An error Vo2 between the sample value Vo2_df and the target value Vo2/TARGET is supplied to the controller 31.

The output KACT of the LAF sensor 16 is delivered to the second decimation filter 37. The output KACT_df from the second decimation filter 37 is compared with the target value FLAF/BASE. An error kact between the sample value KACT_df and the target value FLAF/BASE is supplied to the controller 31.

The exhaust system 19, which is an object to be controlled, can be modeled as shown in the equation (31), in which Vo2/OUT is defined as a control output and the LAF sensor output KACT is defined as a control input.

$$Vo2'(k+1)=a1 \cdot Vo2'(k)+a2 \cdot Vo2'(k-1)+b1 \cdot kact'(k-d3) \text{ where } Vo2'(k)=Vo2/\text{OUT}(k)-Vo2/\text{TARGET } kact'(k)=KACT(k)-FLAF/\text{BASE} \quad (31)$$

A sensor output error Vo2' indicates an error between the O2 sensor output Vo2/OUT and the target value Vo2/

TARGET. An actual air-fuel ratio error kact' indicates an error between the LAF sensor output KACT and the base value FLAF/BASE.

"d3" indicates a dead time in the exhaust system 19. a1, a2 and b1 are model parameters generated by the above-described identifier.

Relation between the O2 sensor output Vo2/OUT and the output Vo2_df of the first decimation filter is represented by the above equation (2). Relation between the LAF sensor output KACT and the output KACT_df of the second decimation filter is represented by the above equation (25).

A system comprising the exhaust system 19, and the first and the second decimation filters 36 and 37 can be obtained based on the equations (2), (25) and (31), as shown by the equation (32).

$$Vo2(k+1) = a1 \cdot Vo2(k) + a2 \cdot Vo2(k-1) + \qquad (32)$$
$$b1 \cdot kact(k-d3-d5+d6)$$
$$= a1 \cdot Vo2(k) + a2 \cdot Vo2(k-1) + b1 \cdot kact(k-d1)$$

where $Vo2(k) = Vo2\_df(k) - Vo2/TARGET$
$kact(k) = KACT\_df(k) - FLAF/BASE$
$d1 = d3 + d5 - d6$ If a dead time d6 in the second decimation filter 37 is equal to a dead time d5 in the first decimation filter 36, a dead time of the exhaust system in which the first and the second decimation filters 36 and 37 are provided is d3. That is, incorporation of the first and the second decimation filters 36 and 37 has no influence on the exhaust system.

On the other hand, the air-fuel ratio manipulating system 18 extending from the ECU 5 through the engine 1 to the LAF sensor 16 is modeled as shown by the above equation (27). A system comprising the air-fuel ratio manipulating system 18, the first and the second decimation filters 36 and 37 is expressed by the above equation (28). The dead time in the first decimation filter has no influence on the air-fuel ratio manipulating system 18.

The air-fuel ratio manipulating system 18 may be included in the object to be controlled by the adaptive air-fuel ratio control. In this case, the model equation of the object to be controlled is expressed based on the equations (32) and (28), as shown by the equation (33). A dead time d is a total dead time in a system comprising the air-fuel ratio manipulating system 18, the exhaust system 19, and the first and second decimation filters 36 and 37.

$$Vo2(k+1) = a1 \cdot Vo2(k) + a2 \cdot Vo2(k-1) + \qquad (33)$$
$$b1 \cdot kcmd(k-d1-d2)$$
$$= a1 \cdot Vo2(k) + a2 \cdot Vo2(k-1) + b1 \cdot kcmd(k-d)$$
$$d = d1 + d2 = d3 + d5 - d6 + d4 + d6 = d3 + d4 + d5$$

Thus, the dead time in the system comprising the air-fuel ratio manipulating system 18, the exhaust system 19 and the first and second decimation filters 36 and 37 is equal to a sum of the dead time d3 in the exhaust system 19, the dead time d4 in the air-fuel ratio manipulating system 18, and the dead time d5 in the first decimation filter. The dead time d6 in the second decimation filter has no influence on the system.

The structure of the controller 31 in the third embodiment is the same as that in the first embodiment. The dead time d1, d2 and d shown in the above equations regarding the identifier 32, the estimator 33 and the sliding mode controller 34 of the controller 31 are (d3+d5−d6), (d4+d6) and (d3+d4+d5), respectively.

According to the third embodiment, chemical noise is removed from the output of the O2 sensor. The shortage of resolution of the LAF sensor can be compensated.

Other Embodiment of the Controller

In the above embodiments, the controller 31 (FIGS. 4, 17 and 22) may perform other response assignment control instead of the sliding mode control.

Figure 23:
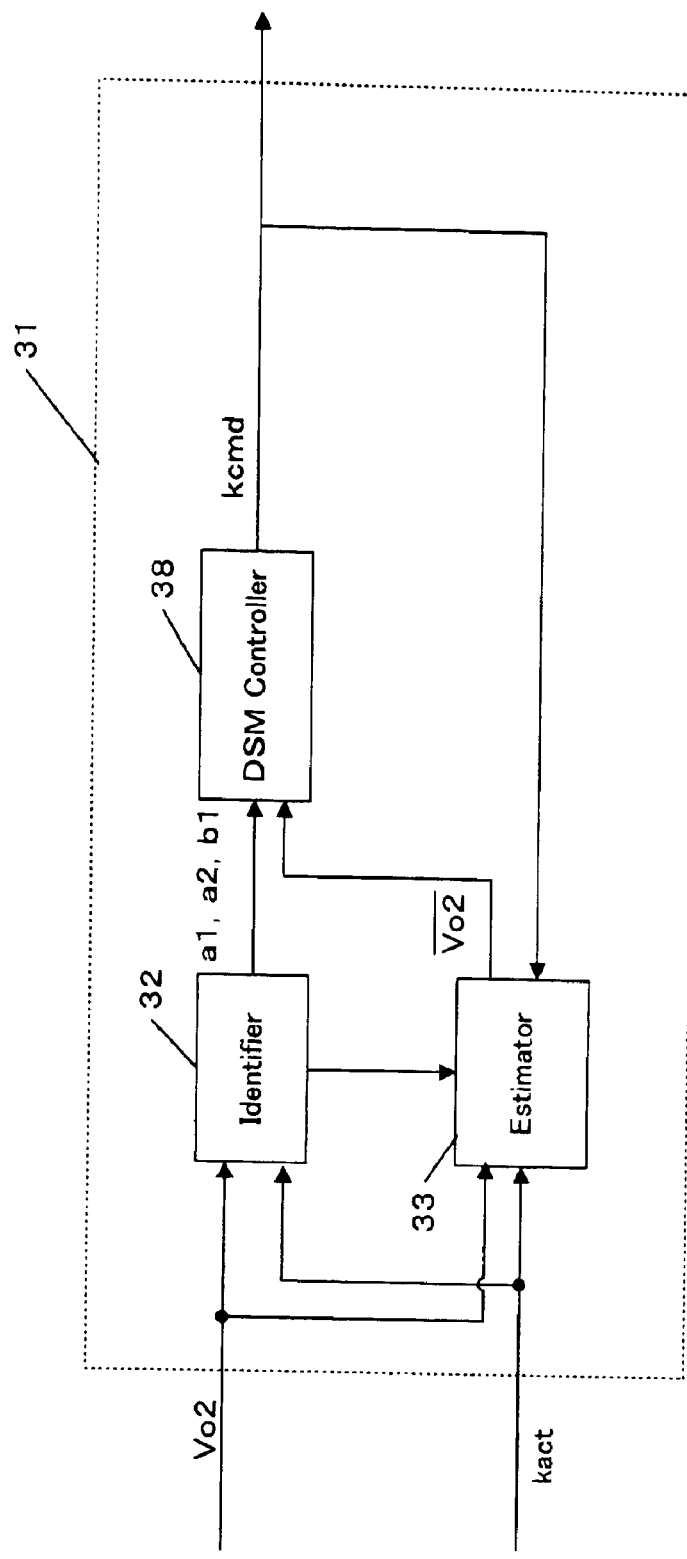
FIG. 23 shows a detailed functional block diagram of a controller according to one embodiment of the present invention.

FIG. 23 shows another embodiment of the controller. The difference from FIG. 4 is that the controller 31 comprises a DSM controller 38 for performing a ΔΣ (delta-sigma) modulation algorithm instead of the sliding mode controller.

Figure 24:
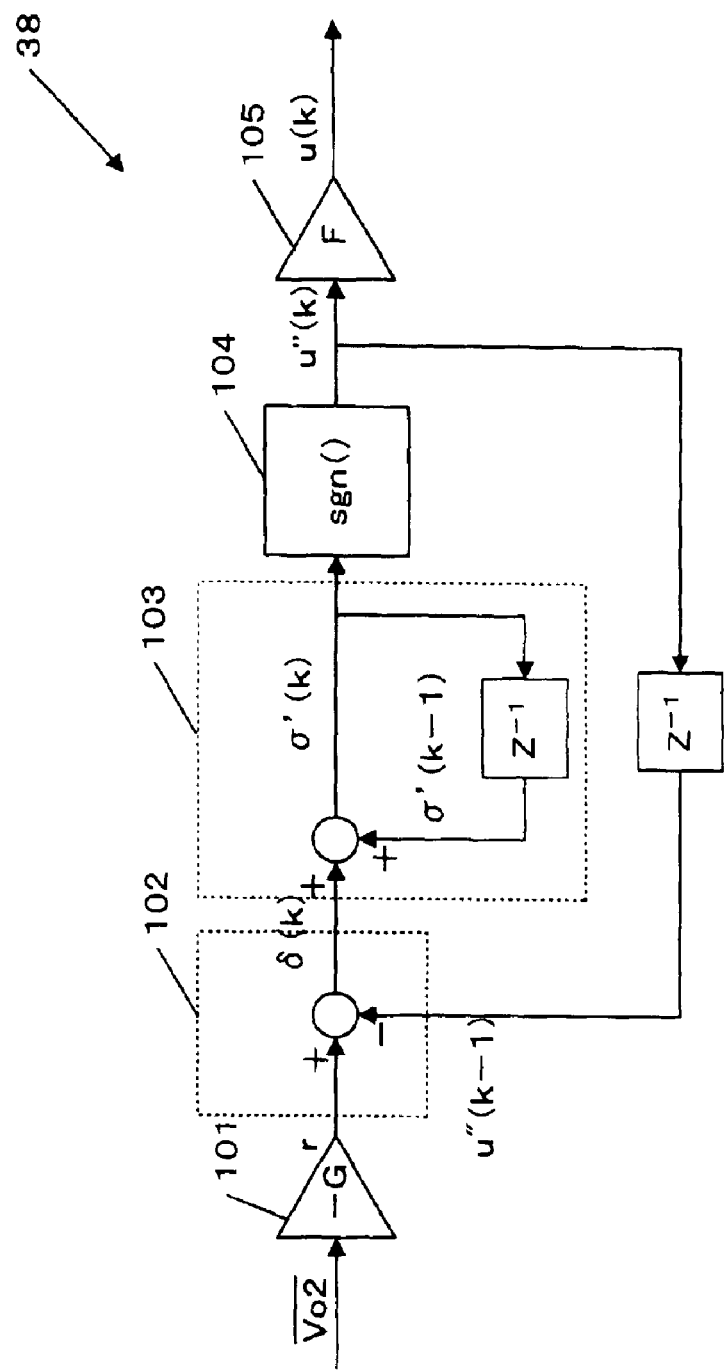
FIG. 24 shows a detailed functional block diagram of a DMS controller according to one embodiment of the present invention.

FIG. 24 shows a block diagram of the DSM controller 38. Since the ΔΣ modulation algorithm is conventionally used, detailed description is omitted. An amplifier 101 multiplies a sensor output error $\overline{Vo2}$, which is estimated by the estimator 33, by a gain "−G" to output a reference signal "r." A subtractor 102 calculates a difference between the reference signal r and the ΔΣ modulation signal u"(k−1) calculated in the previous cycle to output a differential signal δ(k).

An integrator 103 adds the differential signal δ(k) calculated in the current cycle to the integrated signal σ'(k−1) calculated in the previous cycle to output an integrated signal σ'(k) for the current cycle. The sign function 104 determines +/−of the integrated signal σ'(k) to output a signal u"(k). An amplifier 105 multiplies the signal u"(k) by a gain "F" to output a ΔΣ modulation signal u(k). The ΔΣ modulation signal u(k) is a signal indicating the target air-fuel ratio error kcmd. The target air-fuel ratio KCMD is calculated by adding the base value FLAF/BASE to the ΔΣ modulation signal u(k).

Alternatively, the DSM controller 38 may be configured to perform a Δ (delta) modulation algorithm, which does not contain the integrator. The DSM controller 38 may also be configured to perform a ΣΔ (sigma-delta) modulation algorithm, in which the integrator is followed by the subtractor.

In yet another embodiment, the controller 31 comprises both of the sliding mode controller 34 and the DSM controller 38. The controller 31 can switch between sliding mode control (or another response assignment control) and ΔΣ modulation control (or ΣΔ modulation control, Δ modulation control) in accordance with the operating state of the engine. For example, the air-fuel ratio is controlled by the ΔΣ modulation controller when the load of the engine is low, and the air-fuel ratio is controlled by the sliding mode controller when the load of the engine is high.

Control Flow

Figure 25:
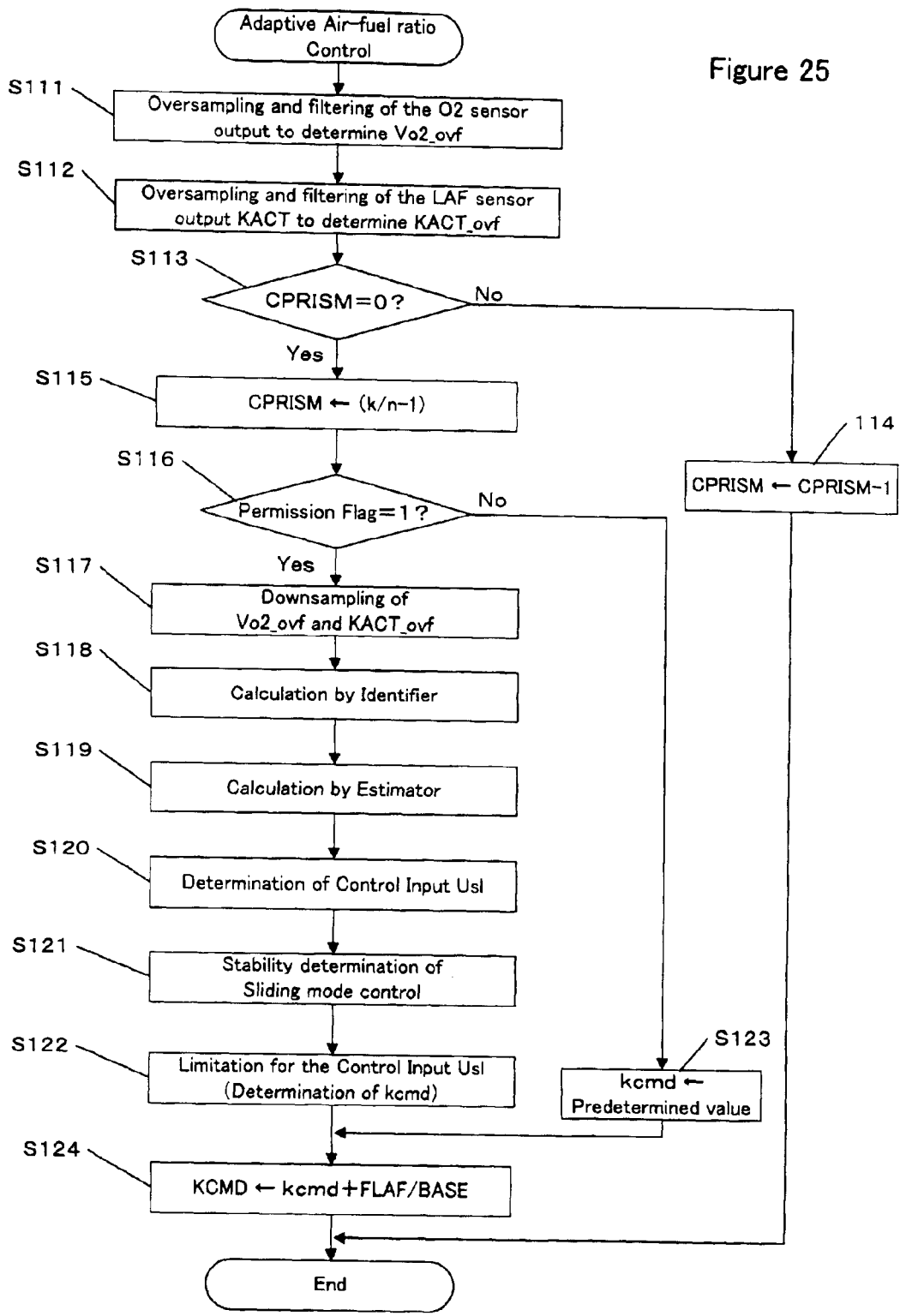
FIG. 25 is a flowchart of a main routine for adaptive air-fuel ratio control according to one embodiment of the present invention.

FIG. 25 shows a flowchart of the adaptive air-fuel ratio control in accordance with the above third embodiment of the present invention. The cycle "n" for the oversampling process in the first decimation filter is the same as the cycle for the oversampling process in the second decimation filter. This routine is performed in cycle "n."

In step S111, the output Vo2/OUT of the O2 sensor is sampled and then filtered by the low-pass filter, to determine Vo2_ovf. In step S112, the LAF sensor output KACT is sampled and then filtered by the low-pass filter to determine KACT_ovf. As described above, since the cycle "n" is shorter than the cycle "k" that is used for calculating the manipulated variable Usl for the air-fuel ratio control, the O2 sensor output Vo2/OUT and the LAF sensor output KACT are oversampled. Steps S111 and S112 may be performed in parallel.

In step S113, it is determined whether a counter CPRISM is zero. The initial value of the counter CPRISM is "k/n−1."

For example, when "n" is ten milliseconds and "k" is fifty milliseconds, the initial value of the counter CPRISM is "4." When the value of the counter CPRISM is not zero, the counter is decremented by one in step S114, exiting the routine. If the counter CPRISM is zero when the routine is re-entered, the process proceeds to step S115, in which the counter is reset. Thus, steps S111 and S112 are carried out in cycle "n" while steps S115 through S122 are carried out in cycle "k."

In step S116, it is determined whether a permission flag is one. The permission flag is a flag that is to be set to one when the execution of the air-fuel ratio control is permitted. For example, the execution of the air-fuel ratio control is not permitted when lean operation is being performed in the engine or when operation for retarding the ignition timing is being performed. When the permission flag is zero, the target air-fuel ratio error kcmd is set to a predetermined value in step S123, and then the process proceeds to step S124.

When the permission flag is one, Vo2_ovf filtered in step S111 is sampled in cycle "k" to determine Vo2_df. KACT_ovf filtered in step S112 is sampled in cycle "k" to determine KACT_df.

In step S118, the calculation process by the identifier is performed to determine the model parameters a1, a2 and b1 as described above. In step S119, the calculation process by the estimator is performed to determine the estimated value $\overline{Vo2}$ as described above. In step S120, the manipulated variable Usl is calculated as described above.

In step S121, the stability of the sliding mode control is determined. For example, it is determined that the sliding mode control is stable when a stability determination base parameter Pstb (=$\overline{\sigma}$(k+d)·$\Delta\overline{\sigma}$) is equal to or less than zero. Pstb is equivalent to the time-differential of the Lyapunov function $\overline{\sigma}^2/2$ concerning the switching function $\overline{\sigma}$. The state in which the function value Pstb is equal to or less than zero indicates a state in which the value of the switching function $\overline{\sigma}$ converges to zero or is converging to zero. The state in which the function value Pstb is greater than zero indicates a state in which the value of the switching function $\overline{\sigma}$ is leaving zero.

In step S122, the limitation process is performed by the limiter to determine the target air-fuel ratio error kcmd. In step S124, the base value FLAF/BASE is added to the target air-fuel ratio error kcmd to determine the target air-fuel ratio KCMD. If the base value FLAF/BASE is established as described above, a step for establishing the base value may be performed after step S124.

The invention may be applied to an engine to be used in a vessel-propelling machine such as an outboard motor in which a crankshaft is disposed in the perpendicular direction.

What is claimed is:

1. A controller for controlling an air-fuel ratio of an internal-combustion engine, comprising:
    a first exhaust gas sensor for detecting oxygen concentration of exhaust gas;
    a first decimation filter connected to the first exhaust gas sensor; and
    a control unit connected to the first decimation filter, the control unit configured to determine a manipulated variable for manipulating the air-fuel ratio so that an output value from the first decimation filter converges to a target value,
    wherein the first decimation filter further comprises:
        a first oversampler for oversampling the output of the first exhaust gas sensor in a shorter cycle than a cycle that is used for determining the manipulated variable;
        a first low-pass filter for smoothing the oversampled value; and
        a first downsampler for re-sampling the smoothed value in the cycle that is used for determining the manipulated variable to output the re-sampled value.

2. The controller of claim 1, wherein the control unit is further configured to perform response assignment control to determine the manipulated variable.

3. The controller of claim 1, wherein the control unit is further configured to perform control that uses one of delta-sigma modulation algorithm, delta modulation algorithm and sigma-delta modulation algorithm to determine the manipulated variable.

4. The controller of claim 1, wherein an object to be controlled by the air-fuel ratio control is an exhaust system, the exhaust system comprising a catalyst converter and the first exhaust gas sensor, the first exhaust gas sensor disposed downstream of the catalyst converter,
    wherein the control unit is further configured to:
        determine a dead time in the exhaust system based on the output value from the first decimation filter;
        calculate an estimated value for the output of the first exhaust gas sensor so that the dead time is compensated; and
        determine the manipulated variable for manipulating the air-fuel ratio based on the estimated value.

5. The controller of claim 4, wherein the object to be controlled by the air-fuel ratio control further comprises an air-fuel ratio manipulating system extending from the control unit through the internal-combustion engine to a second exhaust gas sensor, the second exhaust gas sensor disposed upstream of the catalyst converter,
    wherein the control unit is further configured to:
        determine a dead time in the air-fuel ratio manipulating system; and
        calculate the estimated value for the output of the first exhaust gas sensor so that the dead time in the exhaust system and the dead time in the air-fuel ratio manipulating system are compensated.

6. The controller of claim 4, wherein the control unit is further configured to:
    determine a parameter based on the output value from the first decimation filter; and
    use the parameter for determining the manipulated variable,
    wherein the parameter acts to adapt the manipulation of the air-fuel ratio to state changes of the exhaust system.

7. The controller of claim 1, wherein a cut-off frequency for the first low-pass filter is set to a higher frequency than a frequency that is used to detect a failure of a catalyst converter.

8. A controller for controlling an air-fuel ratio of an internal-combustion engine, comprising:
    a first exhaust gas sensor provided downstream of a catalyst converter, the first exhaust gas sensor detecting oxygen concentration of exhaust gas;
    a second exhaust gas sensor provided upstream of the catalyst converter, the second exhaust gas sensor detecting an air-fuel ratio of the exhaust gas;
    a second decimation filter connected to the second exhaust gas sensor; and
    a control unit connected to the second decimation filter, the control unit configured to determine a manipulated variable for manipulating the air-fuel ratio based on the output value from the second decimation filter so that an output value from the first exhaust gas sensor converges to a target value, wherein the second decimation filter further comprises:
  a second oversampler for oversampling the output of the second exhaust gas sensor in a shorter cycle than a cycle that is used for determining the manipulated variable;
  a second low-pass filter for smoothing the oversampled value; and
  a second downsampler for re-sampling the smoothed value in the cycle that is used for determining the manipulated variable to output the re-sampled value.

9. The controller of claim 8, wherein the control unit is further configured to perform response assignment control to determine the manipulated variable.

10. The controller of claim 8, wherein the control unit is further configured to perform control that uses one of delta-sigma modulation algorithm, delta modulation algorithm and sigma-delta modulation algorithm to determine the manipulated variable.

11. The controller of claim 8, wherein an object to be controlled by the air-fuel ratio control is an exhaust system, the exhaust system extending from the second exhaust gas sensor through the catalyst converter to the first exhaust gas sensor,
  wherein the control unit is further configured to:
    determine a dead time in the exhaust system based on the output value from the second decimation filter;
    calculate an estimated value for the output of the first exhaust gas sensor so that the dead time is compensated; and
    determine the manipulated variable for manipulating the air-fuel ratio based on the estimated value.

12. The controller of claim 11, wherein the object to be controlled by the air-fuel ratio control further comprises an air-fuel ratio manipulating system extending from the control unit through the internal-combustion engine to the second exhaust gas sensor,
  wherein the control unit is further configured to:
    determine a dead time in the air-fuel ratio manipulating system; and
    calculate the estimated value for the output of the first exhaust gas sensor so that the dead time in the exhaust system and the dead time in the air-fuel ratio manipulating system are compensated.

13. The controller of claim 11, wherein the control unit is further configured to:
  determine a parameter based on the output value from the second decimation filter; and
  use the parameter for determining the manipulated variable,
  wherein the parameter acts to adapt the manipulation of the air-fuel ratio to state changes of the exhaust system.

14. The controller of claim 8, wherein a cut-off frequency for the second low-pass filter is set to a higher frequency than a frequency that is used to detect a failure of a catalyst converter.

15. A method for controlling an air-fuel ratio of an internal-combustion engine, comprising the steps of:
  (a) oversampling the output of an exhaust gas sensor, the exhaust gas sensor provided in an exhaust manifold of the engine;
  (b) low-pass filtering the oversampled value;
  (c) re-sampling the filtered value; and
  (d) determining a manipulated variable for manipulating the air-fuel ratio based on the re-sampled value,
  wherein a sampling cycle used for the oversampling step is shorter than a cycle used for the determining step, and
  wherein a sampling cycle used for the re-sampling step is the same as the cycle used for the determining step.

16. The method of claim 15, wherein the exhaust gas sensor is a first sensor for detecting oxygen concentration of exhaust gas flowing through the exhaust manifold, the first sensor provided downstream of a catalyst converter.

17. The method of claim 15, wherein the exhaust gas sensor is a second sensor for detecting an air-fuel ratio of exhaust gas flowing through the exhaust manifold, the second sensor provided upstream of a catalyst converter.

18. The method of claim 15, wherein the step (d) further comprises the step of performing response assignment control to determine the manipulated variable.

19. The method of claim 15, wherein the step (d) further comprises the step of performing one of delta-sigma modulation algorithm, delta modulation algorithm and sigma-delta modulation algorithm to determine the manipulated variable.

20. The method of claim 16, further comprising the steps of:
  determining a dead time based on the re-sampled value, the dead time being a time required for the air-fuel manipulation to be reflected in the output of the first sensor;
  calculating an estimated value for the output of the first sensor so that the dead time is compensated; and
  determining the manipulated variable for manipulating the air-fuel ratio so that the estimated value converges to a target value.

21. The method of claim 17, further comprising the steps of:
  determining a dead time based on the re-sampled value, the dead time is being a time required for the air-fuel manipulation to be reflected in the output of a first sensor, the first sensor provided downstream of the catalyst;
  calculating an estimated value for the output of the first sensor so that the dead time is compensated; and
  determining the manipulated variable for manipulating the air-fuel ratio so that the estimated value converges to a target value.

22. The method of claim 15, further comprising the steps of:
  determining a parameter based on the re-sampled value; and
  using the parameter for determining the manipulated variable, the parameter acting to adapt the air-fuel ratio manipulation to state changes of an exhaust system of the engine.

23. The method of claim 15, wherein a cut-off frequency for the low-pass filtering step (b) is set to a higher frequency than a frequency that is used to detect a failure of a catalyst converter.

24. A computer program stored on a computer readable medium for use in controlling an air-fuel ratio of an internal-combustion engine, the computer program comprising:
  (a) program code for oversampling the output of an exhaust gas sensor, the exhaust gas sensor provided in an exhaust manifold of the engine;
  (b) program code for low-pass filtering the oversampled value;
  (c) program code for re-sampling the filtered value; and
  (e) program code for determining a manipulated variable for manipulating the air-fuel based on the re-sampled value, wherein a sampling cycle used for the program code for oversampling is shorter than a cycle used for the program code for determining the manipulated variable, and wherein a sampling cycle used for the program code for re-sampling is the same as the cycle used for the program code for determining the manipulated variable.

25. The computer program of claim 24, wherein the exhaust gas sensor is a first sensor for detecting oxygen concentration of exhaust gas flowing through the exhaust manifold, the first sensor provided downstream of a catalyst converter.

26. The computer program of claim 24, wherein the exhaust gas sensor is a second sensor for detecting an air-fuel ratio of exhaust gas flowing through the exhaust manifold, the second sensor provided upstream of a catalyst converter.

27. The computer program of claim 24, wherein the program code for determining the manipulated variable further comprises program code for performing response assignment control to determine the manipulated variable.

28. The computer program of claim 24, wherein the program code for determining the manipulated variable further comprises program code for performing one of delta-sigma modulation algorithm, delta modulation algorithm and sigma-delta modulation algorithm to determine the manipulated variable.

29. The computer program of claim 25, further comprising:

program code for determining a dead time based on the re-sampled value, the dead time being a time required for the air-fuel manipulation to be reflected in the output of the first sensor;

program code for calculating an estimated value for the output of the first sensor so that the dead time is compensated; and program code for determining the manipulated variable for manipulating the air-fuel ratio so that the estimated value converges to a target value.

30. The computer program of claim 26, further comprising:

program code for determining a dead time based on the re-sampled value, the dead time is being a time required for the air-fuel manipulation to be reflected in the output of a first sensor, the first sensor provided downstream of the catalyst;

program code for calculating an estimated value for the output of the first sensor so that the dead time is compensated; and program code for determining the manipulated variable for manipulating the air-fuel ratio so that the estimated value converges to a target value.

31. The computer program of claim 24, further comprising:

program code for determining a parameter based on the re-sampled value; and program code for using the parameter for determining the manipulated variable, the parameter acting to adapt the air-fuel ratio manipulation to state changes of an exhaust system of the engine.

32. The computer program of claim 24, wherein a cut-off frequency used in the program code for low-pass filtering is set to a higher frequency than a frequency used to detect a failure of a catalyst converter.

* * * * *